United States Patent
Hamada et al.

(10) Patent No.: US 11,272,224 B2
(45) Date of Patent: Mar. 8, 2022

(54) INFORMATION PROCESSING DEVICE AND METHOD

(71) Applicant: SONY CORPORATION, Tokyo (JP)

(72) Inventors: Toshiya Hamada, Tokyo (JP); Kenichi Kanai, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/040,101

(22) PCT Filed: Dec. 26, 2018

(86) PCT No.: PCT/JP2018/047696
§ 371 (c)(1),
(2) Date: Sep. 22, 2020

(87) PCT Pub. No.: WO2019/187430
PCT Pub. Date: Oct. 3, 2019

(65) Prior Publication Data
US 2021/0029386 A1 Jan. 28, 2021

(30) Foreign Application Priority Data
Mar. 29, 2018 (JP) .............................. JP2018-065015

(51) Int. Cl.
*H04N 21/218* (2011.01)
*H04N 21/233* (2011.01)
(Continued)

(52) U.S. Cl.
CPC ..... *H04N 21/21805* (2013.01); *G10L 19/008* (2013.01); *H04N 21/233* (2013.01); *H04N 21/4394* (2013.01)

(58) Field of Classification Search
CPC .......... H04N 21/21805; H04N 21/233; H04N 21/4394; H04N 21/8456; H04N 21/816;
(Continued)

(56) References Cited

U.S. PATENT DOCUMENTS

| 2010/0153395 | A1* | 6/2010 | Hannuksela | ..... H04N 21/85406 707/737 |
| 2010/0262628 | A1* | 10/2010 | Singer | .............. H04N 21/85406 707/803 |
| 2017/0092280 | A1* | 3/2017 | Hirabayashi | ........... G11B 20/12 |

FOREIGN PATENT DOCUMENTS

| CN | 106415711 A | 2/2017 |
| EP | 3151240 A1 | 4/2017 |

(Continued)

OTHER PUBLICATIONS

International Search Report and Written Opinion of PCT Application No. PCT/JP2018/047696, dated Feb. 12, 2019, 8 pages of ISRWO.

(Continued)

*Primary Examiner* — Alazar Tilahun
(74) *Attorney, Agent, or Firm* — Chip Law Group

(57) ABSTRACT

To propose an information processing device and an information processing method to correct positions of audio objects during viewpoint switching. Provided is the information processing device which includes a content file generating unit that stores viewpoint switching information, which is to be used in correcting the positions of audio objects during viewpoint switching among a plurality of viewpoints, in the header of a content file and generates the content file.

12 Claims, 31 Drawing Sheets

(51) Int. Cl.
*H04N 21/439* (2011.01)
*G10L 19/008* (2013.01)

(58) Field of Classification Search
CPC .......... H04N 21/85406; H04N 21/8106; G10L 19/008; G10L 19/167
See application file for complete search history.

(56) References Cited

FOREIGN PATENT DOCUMENTS

KR   10-2017-0012229 A    2/2017
WO      2015/182491 A1   12/2015

OTHER PUBLICATIONS

Tani, et al., "QoE Assessment of Multi-View Video and Audio (MVV-A) Transmission with MPEG-DASH", Technical Report of IEICE, vol. 114, No. 488, Feb. 24, 2015, pp. 37-42.

"Information Technology—High Efficiency Coding and Media Delivery in Heterogeneous Environments—Part 3: 3D Audio", ISO/IEC 23008-3:2015, Oct. 15, 2015, 11 pages.

"Information Technology—Coding of audiovisual objects—Part 12: ISO base media file format", ISO/IEC 14496-12, Dec. 15, 2015, 17 pages.

\* cited by examiner

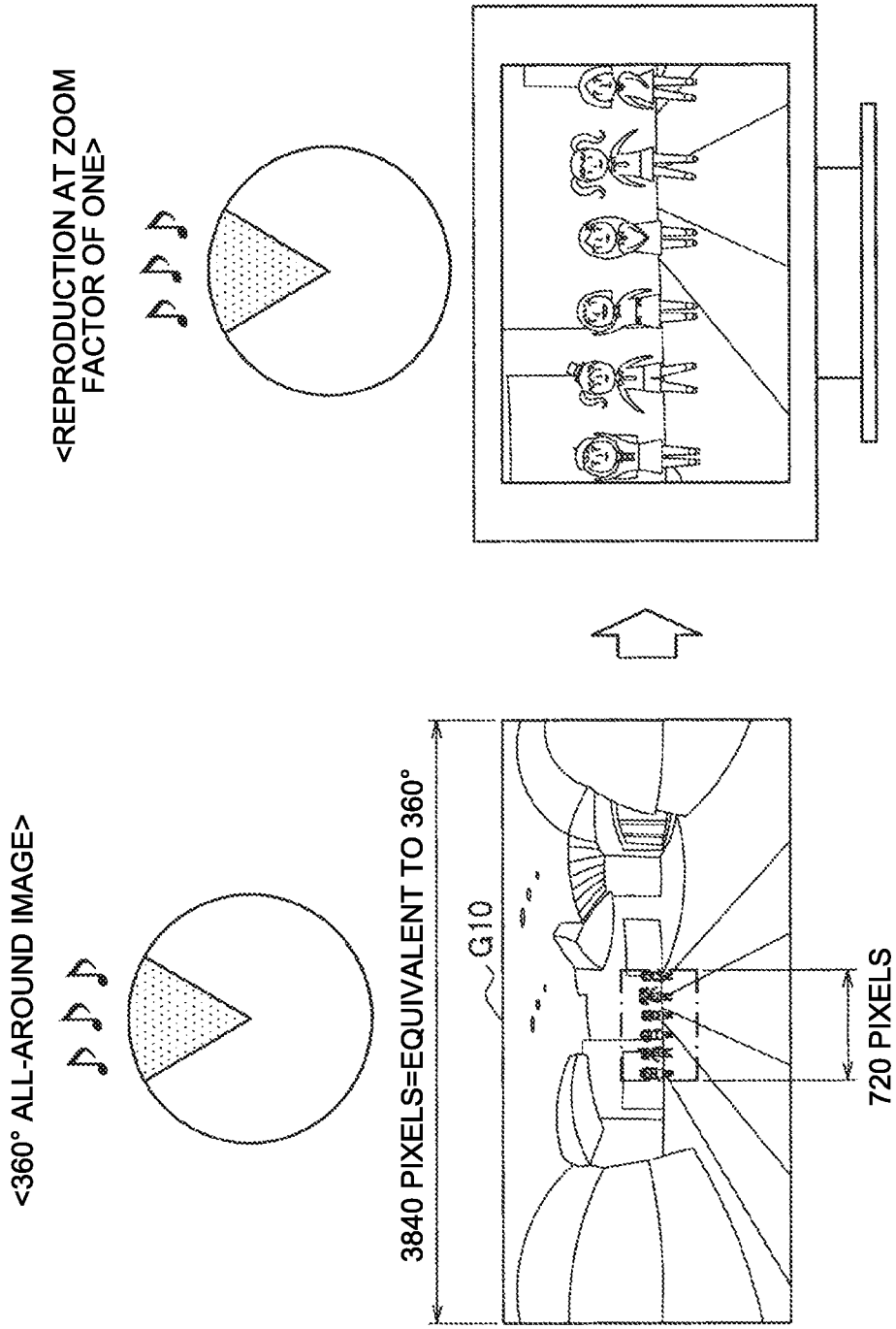

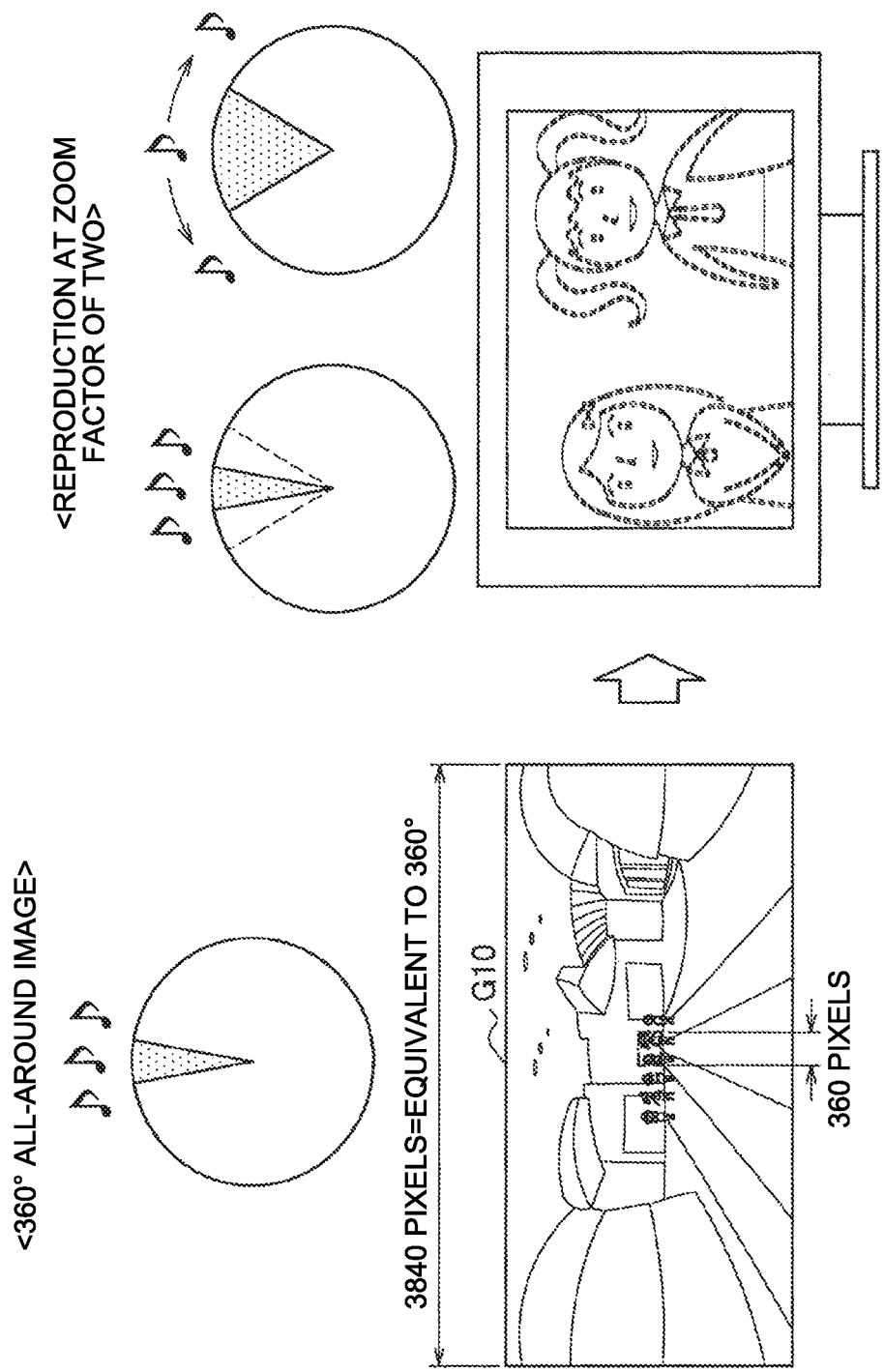

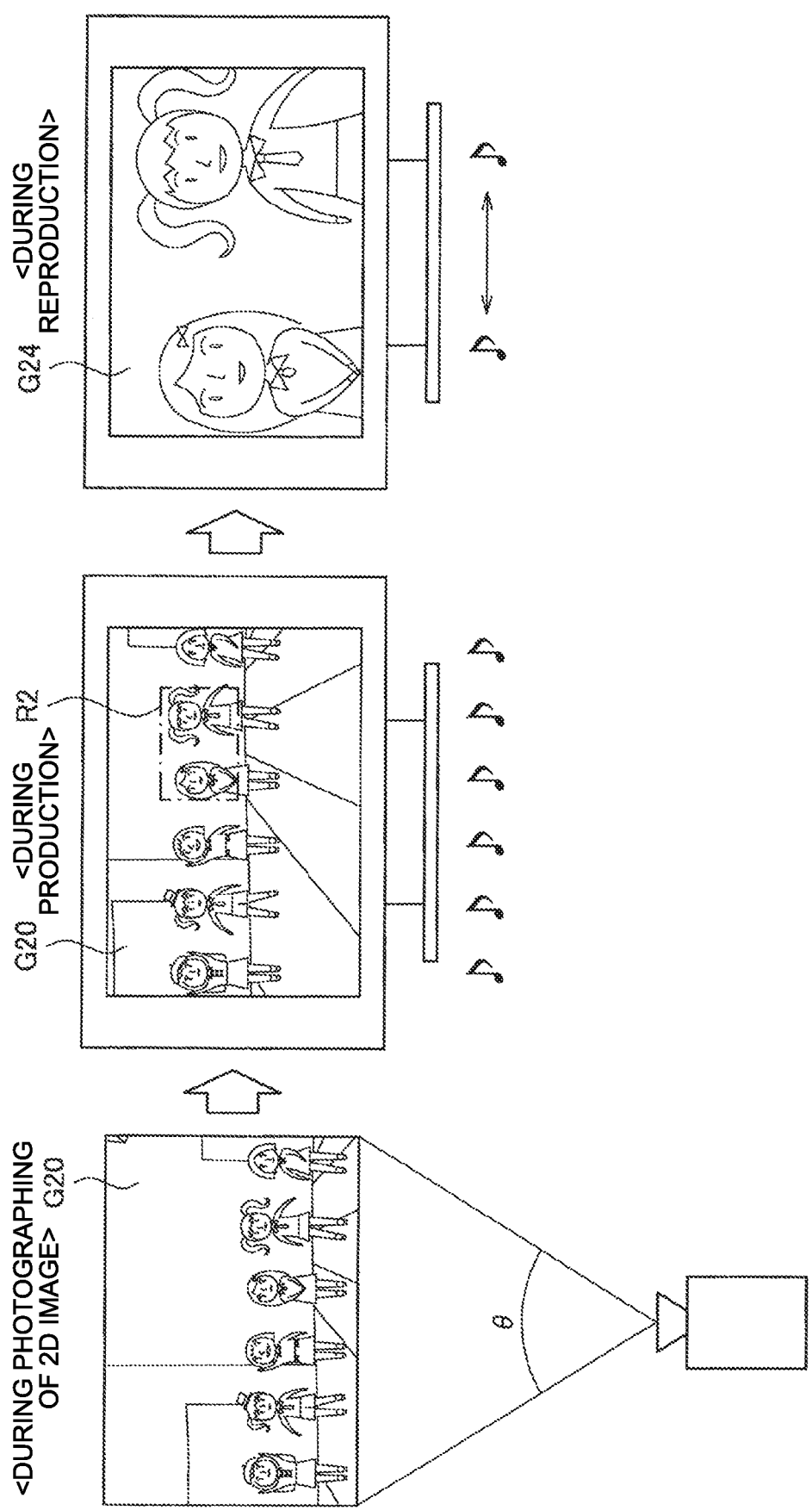

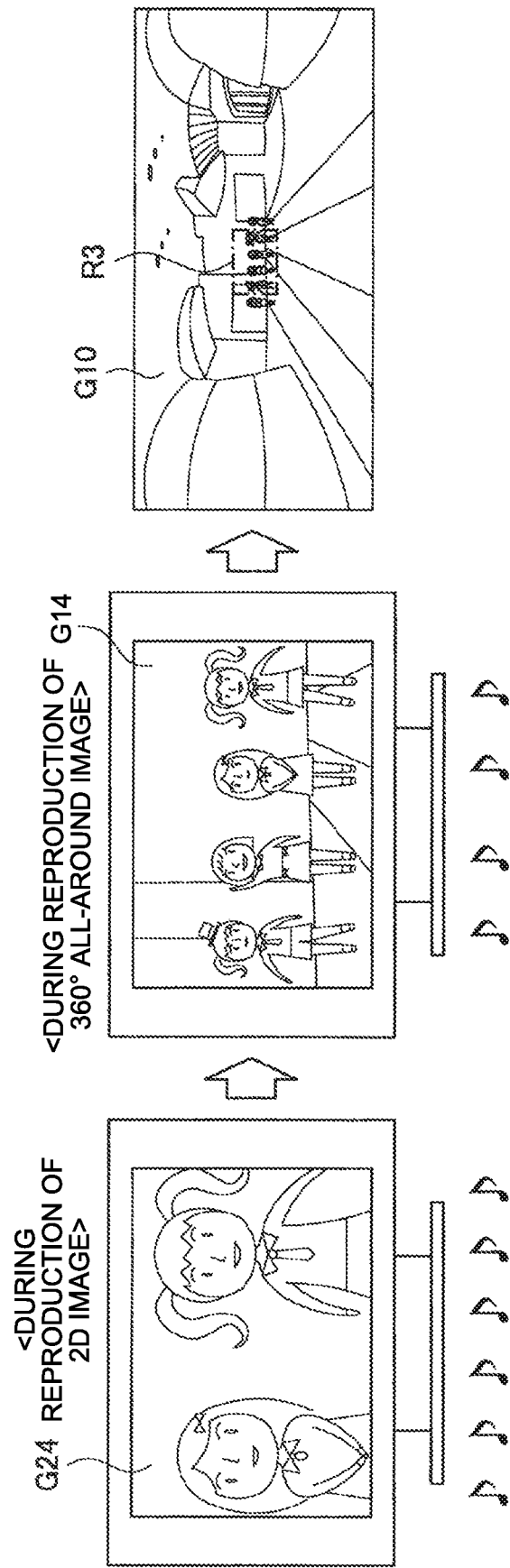

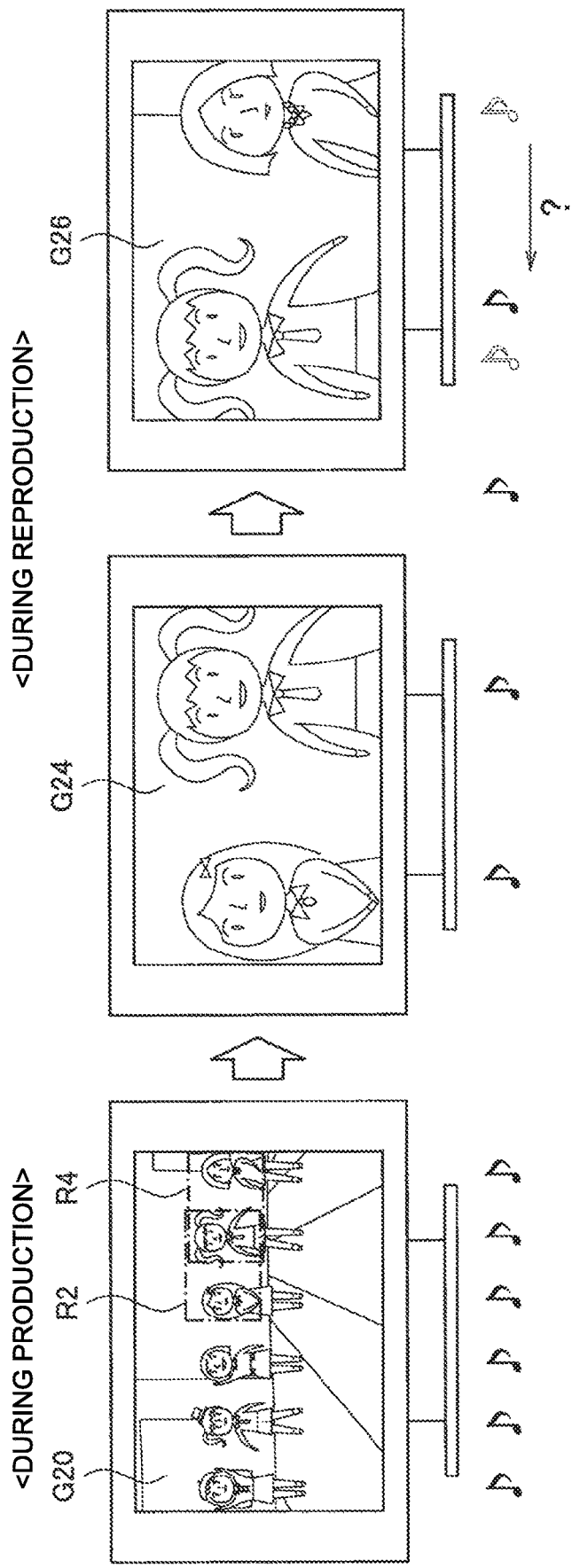

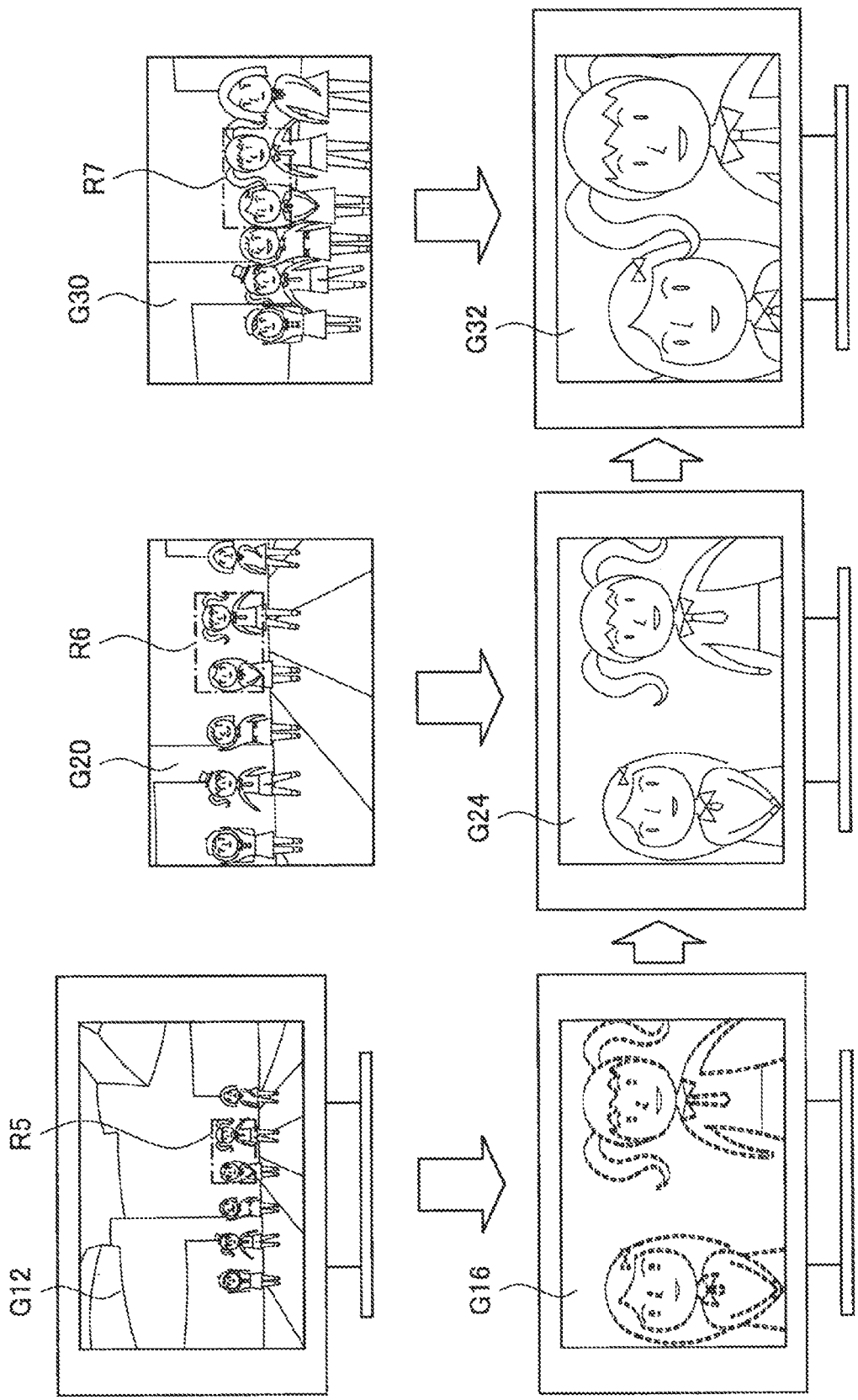

FIG.9

| MULTI-VIEW ZOOM SWITCHING INFORMATION | EXPLANATION | EXAMPLE OF VALUES (INFORMATION HELD BY VIEWPOINT VP1) |
|---|---|---|
| IMAGE TYPE INFORMATION | CLASSIFICATION INDICATING WHETHER IMAGE IS 2D IMAGE, OR 360° ALL-AROUND IMAGE, OR SOME OTHER TYPE OF IMAGE | 2D IMAGE |
| PHOTOGRAPHING RELATED INFORMATION | POSITION, DIRECTION, HORIZONTAL ANGLE OF VIEW, VERTICAL ANGLE OF VIEW | (x, y, z), (u, v, w), 60°, 40° |
| ANGLE-OF-VIEW INFORMATION FOR CONTENT PRODUCTION | HORIZONTAL ANGLE OF VIEW, VERTICAL ANGLE OF VIEW | 90°, 60° |
| NUMBER OF SETS OF SWITCHING DESTINATION VIEWPOINT INFORMATION | NUMBER OF LISTED SETS OF SWITCHING DESTINATION VIEWPOINT INFORMATION | 2 |
| SWITCHING DESTINATION VIEWPOINT INFORMATION 1 | (TOP LEFT X-COORDINATE, TOP LEFT Y-COORDINATE, HORIZONTAL WIDTH, VERTICAL WIDTH), THRESHOLD VALUE FOR SWITCHING, VIEWPOINT IDENTIFICATION INFORMATION OF SWITCHING DESTINATION VIEWPOINT | (0, 540, 960, 540), 3, VP2 |
| SWITCHING DESTINATION VIEWPOINT INFORMATION 2 | SAME AS ABOVE | (960, 0, 960, 540), 2, VP3 |

FIG.22

```
1   <MPD>
2   <Period>
3   <AdaptationSet id="1">
4   <EssentialProperty schemeIdUri = "urn:mpeg:dash:multi-view_zoom_switch_parameters:2018" value="2D, 60, 40,(0,0),(10,20,30),90,60,2, (0,540 ,960,540), 3,2, (960,0,960,540),2, 3" />
5   <Representation id="1" bandwidth="30000000" frameRate="60" width="3840" height="2160">
6   <BaseURL>100.mp4</BaseURL></Representation></AdaptationSet>
7   <AdaptationSet id="2">
8   <EssentialProperty schemeIdUri = "urn:mpeg:dash:multi-view_zoom_switch_parameters:2018" value="2D, 60, 40,(10,10,0),(10,20,30),90,60,1, (0,540 ,960,540), 4,4" />
9   <Representation id="1" bandwidth="30000000" frameRate="60" width="3840" height="2160">
10  <BaseURL>200.mp4</BaseURL> </Representation></AdaptationSet>
11  <AdaptationSet id="3">
12  <EssentialProperty schemeIdUri = "urn:mpeg:dash:multi-view_zoom_switch_parameters:2018" value="2D, 60, 40,(-10,20,0),(20,30,40),45,30,1, (960,0,960,540), 2,5" />
13  <Representation id="1" bandwidth="30000000" frameRate="60" width="3840" height="2160">
14  <BaseURL>300.mp4</BaseURL></Representation></AdaptationSet>
15  </Period>
16  </MPD>
```

FIG.23

```
1   <MPD>
2   <Period>
3   <EssentialProperty schemeidUri = "urn:mpeg:dash:multi-view_zoom_switch_parameters:2018" value="1, 2D, 30, 40,(0,0,0),(10,20,30),90,60,2, (0,540, 960,540), 3,2, (960,0,960,540),2, 3" />
4   <EssentialProperty schemeidUri = "urn:mpeg:dash:multi-view_zoom_switch_parameters:2018" value="2, 2D, 30,40,(10,10,0),(10,20,30),80,60,1, (0,540, 960,540), 4,4" />
5   <EssentialProperty schemeidUri = "urn:mpeg:dash:multi-view_zoom_switch_parameters:2018" value="3, 2D, 30, 40,(-10,20,0),(20,30,40),45,30,1, (960,0,960,540), 2,5" />
6   <AdaptationSet id="1">
7   <Representation id="1" bandwidth="30000000" frameRate="30" width="3840" height="2160">
8     <BaseURL>100.mp4</BaseURL> </Representation></AdaptationSet>
9   <AdaptationSet id="2">
10  <Representation id="1" bandwidth="36000000" frameRate="30" width="3840" height="2160">
11    <BaseURL>200.mp4</BaseURL> </Representation></AdaptationSet>
12  <AdaptationSet id="3">
13  <Representation id="1" bandwidth="30000000" frameRate="30" width="3840" height="2160">
14    <BaseURL>300.mp4</BaseURL> </Representation></AdaptationSet>
15  </Period>
16  </MPD>
```

FIG.24

```
1   <MPD>
2   <Period>
3   <AdaptationSet id="1">
4   <EssentialProperty schemeIdUri = "urn:mpeg:dash:multi-view_zoom_switch_parameters:2018" value="POS-100.txt" />
5   <Representation id="1" bandwidth="30000000" frameRate="60" width="3840" height="2160">
6   <BaseURL>100.mp4</BaseURL> </Representation></AdaptationSet>
7   <AdaptationSet id="2">
8   <EssentialProperty schemeIdUri = "urn:mpeg:dash:multi-view_zoom_switch_parameters:2018" value="POS-200.txt" />
9   <Representation id="1" bandwidth="30000000" frameRate="60" width="3840" height="2160">
10  <BaseURL>200.mp4</BaseURL> </Representation></AdaptationSet>
11  <AdaptationSet id="3">
12  <EssentialProperty schemeIdUri = "urn:mpeg:dash:multi-view_zoom_switch_parameters:2018" value="POS-300.txt" />
13  <Representation id="1" bandwidth="30000000" frameRate="60" width="3840" height="2160">
14  <BaseURL>300.mp4</BaseURL> </Representation></AdaptationSet>
15  </Period>
16  </MPD>
```

FIG.30

| 1 | Box Type: 'mvzs' |
| 2 | Container: User data box ('udta') |
| 3 | Mandatory: No |
| 4 | Quantity: Zero or more |
| 5 | |
| 6 | aligned(8) class MultiViewZoomSwitchParametersBox extends FullBox('mvzs', version = 0, 0) { |
| 7 | int32 video_type |
| 8 | int32 capture_x |
| 9 | int32 capture_y |
| 10 | int32 capture_z |
| 11 | int32 capture_u |
| 12 | int32 capture_v |
| 13 | int32 capture_w |
| 14 | int32 frame_x |
| 15 | int32 frame_y |
| 16 | int32 creation_x |
| 17 | int32 creation_y |
| 18 | int32 number_of_destination_views |
| 19 | for (i=0; i< number_of_destination_views; i++){ |
| 20 | int32 region_x[i] |
| 21 | int32 region_y[i] |
| 22 | int32 region_width[i] |
| 23 | int32 region_height[i] |
| 24 | float32 switch_threshold[i] |
| 25 | int32 destination_view_id[i] |
| 26 | } |
| 27 | } |

FIG.32

```
1   class MultiViewZoomSwitchParametersSampleEntry  extends SampleEntry ("mvzs"){
2   const unsigned int(16) version = 1;
3   int32  video_type
4   int32  capture_x
5   int32  capture_y
6   int32  capture_z
7   int32  capture_u
8   int32  capture_v
9   int32  capture_w
10  int32  frame_x
11  int32  frame_y
12  int32  creation_x
13  int32  creation_y
14  int32  number_of_destination_views
15  for (i=0; i< number_of_destination_views; i++){
16    int32       region_x[i]
17    int32       region_y[i]
18    int32  region_width[i]
19    int32  region_height[i]
20    float32     switch_threshold[i]
21    int32  destination_view_id[i]
22  }
23  }
```

INFORMATION PROCESSING DEVICE AND METHOD

CROSS REFERENCE TO RELATED APPLICATIONS

This application is a U.S. National Phase of International Patent Application No. PCT/JP2018/047696 filed on Dec. 26, 2018, which claims priority benefit of Japanese Patent Application No. JP 2018-065015 filed in the Japan Patent Office on Mar. 29, 2018. Each of the above-referenced applications is hereby incorporated herein by reference in its entirety.

FIELD

The application concerned is related to an information processing device, a method, and a program.

BACKGROUND

With the aim of achieving audio replay with a higher degree of realistic sensation; for example, MPEG-H 3D Audio is known as an encoding technology for transmitting a plurality of sets of audio data prepared for audio objects (refer to Non Patent Literature 1).

The plurality of sets of encoded audio data is included, along with image data, in content files such as ISO base media file format (ISOBMFF) files for which the standard definition is given in, for example, Non Patent Literature 2; and the content files are then provided to the user.

CITATION LIST

Patent Literature

Non Patent Literature 1: ISO/IEC 23008-3:2015 Information technology—High efficiency coding and media delivery in heterogeneous environments
Non Patent Literature 2: ISO/IEC 14496-12:2014 Information technology—Coding of audio-visual objects

SUMMARY

Technical Problem

On the other hand, in recent years, multi-view content is becoming popular on account of enabling display of images while switching among a plurality of viewpoints. In the sound reproduction of such multi-view content, sometimes there occurs a mismatch in the positions of the audio objects before and after switching between viewpoints, thereby causing, for example, a feeling of strangeness in the user.

In that regard, in the application concerned, an information processing device, an information processing method, and a program in a new and improved form are proposed in which the positions of the audio objects are corrected during viewpoint switching among a plurality of viewpoints, thereby enabling achieving reduction in the feeling of strangeness of the user.

Solution to Problem

According to the present disclosure, an information processing device is provided that includes a content file generating unit that stores viewpoint switching information, which is to be used in correcting position of audio object during viewpoint switching among a plurality of viewpoints, in header of a content file, and generates the content file.

Moreover, according to the present disclosure, an information processing method implemented in an information processing device is provided that includes: generating that includes storing viewpoint switching information, which is to be used in correcting position of audio object during viewpoint switching among a plurality of viewpoints, in header of a content file, and generating the content file.

Moreover, according to the present disclosure, a program is provided that causes a computer to implement a function of generating that includes storing viewpoint switching information, which is to be used in correcting position of audio object during viewpoint switching among a plurality of viewpoints, in header of a content file, and generating the content file.

Advantageous Effects of Invention

As explained above, according to the application concerned, the positions of the audio objects are corrected during viewpoint switching among a plurality of viewpoints, thereby enabling achieving reduction in the feeling of strangeness of the user.

Meanwhile, the abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 3 is an explanatory diagram for explaining about the correction of the positions of the audio objects by following the zooming of the video at the time of reproduction.
FIG. 4 is an explanatory diagram for explaining about the correction of the positions of the audio objects by following the zooming of the video at the time of reproduction.
FIG. 5 is an explanatory diagram for explaining about the position correction of the audio objects when viewpoint switching is not performed.
FIG. 6 is an explanatory diagram for explaining about the position correction of the audio objects when viewpoint switching is performed.
FIG. 7 is an explanatory diagram for explaining about the position correction of the audio objects when the photographing angle of view is not identical to the display angle of view at the time of content production.
FIG. 8 is an explanatory diagram for explaining the overview of the concerned technology.
FIG. 9 is a table illustrating an example of multi-view zoom switching information.

FIG. 22 is a diagram illustrating an example of an MPD file generated by a metadata file generating unit 114 according to the first embodiment.

FIG. 23 is a diagram illustrating another example of an MPD file generated by the metadata file generating unit 114 according to the first embodiment.

FIG. 24 is a diagram illustrating an example of an MPD file generated by the metadata file generating unit 114 according to a modification example of the first embodiment.

FIG. 30 is a diagram illustrating an example of "udta" box in the case in which the multi-view zoom switching information is stored in the "udta" box.

FIG. 32 is a diagram for explaining the multi-view zoom switching information that is stored in the "moov" box by a content file generating unit 613.

DESCRIPTION OF EMBODIMENTS

Figure 1:
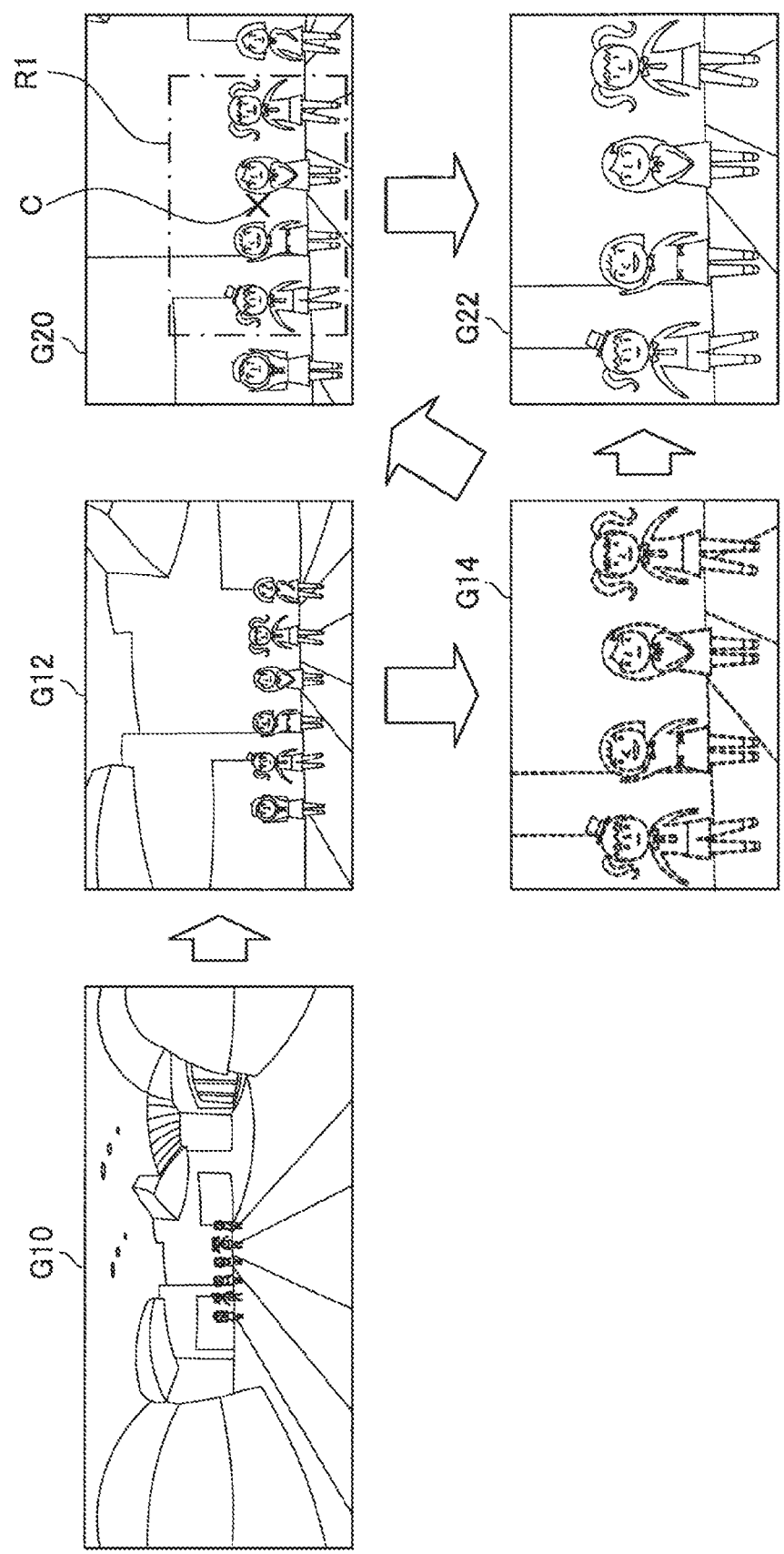
FIG. 1 is an explanatory diagram for explaining the background of the application concerned.

Preferred embodiments of the application concerned are described below in detail with reference to the accompanying drawings. In the present written description and the drawings, the constituent elements having practically identical functional configuration are referred to by the same reference numerals, and the explanation is not given repeatedly.

Moreover, in the present written description and the drawings, a plurality of constituent elements having practically identical functions are sometimes distinguished by assigning different alphabets to the same reference numeral. However, when a plurality of constituent elements having practically identical functions need not be particularly distinguished from each other; only the same reference numeral is used.

The explanation is given in the following sequence.
<<1. Background>>
<<2. Principle of concerned technology>>
<<3. First embodiment>>
<<4. Second embodiment>>
<<5. Exemplary hardware configuration>>
<<6. Summary>>

1. Background

Firstly, the explanation is given about the background of the application concerned.

In recent years, multi-view content is becoming popular on account of enabling display of images while switching among a plurality of viewpoints. In such multi-view content, the images corresponding to each viewpoint include two-dimensional 2D images as well as include 360° all-around images that are photographed using an all-around camera. In the case of displaying a 360° all-around image, for example, based on the viewing position and the viewing direction of the user as decided on the basis of the user input or sensing, a partial range is clipped from the 360° all-around image and the clipped display image is displayed. Of course, in the case of displaying a 2D image too, a display image obtained by clipping a partial range from that 2D image can be displayed.

Explained below with reference to FIG. 1 is a use case in which the user is viewing multi-view content, which includes a 360° all-around image and a 2D image, while varying the clipping range of the display image. FIG. 1 is an explanatory diagram for explaining the background of the application concerned.

In the example illustrated in FIG. 1, a 360° all-around image G10 expressed using equidistant cylindrical projection and a 2D image G20 are included in the multi-view content. The 360° all-around image G10 and the 2D image G20 are images photographed from different viewpoints.

Moreover, in FIG. 1 is illustrated a display image G12 that is obtained by clipping a partial range from the 360° all-around image G10. While the display image G12 is being displayed; for example, the zoom factor (the display magnification) can be further increased and a display image G14, which is obtained by further clipping a partial range from the display image G12, can also be displayed.

Meanwhile, when the pixel count of a display image is smaller than the display pixel count of the display device, the display image gets enlarged before being displayed. The pixel count of a display image is decided according to the pixel count of the clipping source and according to the size of the clipping range. Thus, when the 360° all-around image G10 has a low pixel count or when the range for clipping the display image G14 is small, there is a decrease in the pixel count of the display image G14 too. That may result in deterioration in the image quality, such as blurring, in the display image G14 as illustrated in FIG. 1. If the zoom factor is further increased with reference to the display image G14, the image quality may undergo further deterioration.

If the range equivalent to the display image G14 is captured in the 2D image G20 and if the 2D image G20 has a high pixel count, then it is possible to think of switching the viewpoint. When the 2D image G20 is displayed after switching the viewpoint, the zoom factor can be further increased and a display image G22 can be displayed that is obtained by clipping a range R1, which is equivalent to the display image G14, from the 2D image G20. Thus, the display image G22 in which the range equivalent to the display image G14 is captured is expected to have less deterioration in the image quality than the display image G14, and is expected to endure a further increase in the zoom factor for viewing purposes.

In the case of displaying a 360° all-around image, the deterioration in the image quality may occur not only when the zoom factor is large but also when the zoom factor is small. For example, when the zoom factor is small, sometimes the distortion in a display image, which has been clipped from the 360° all-around image, becomes conspicuous. In such a case too, switching to the viewpoint for 2D images becomes an effective option.

However, as explained above, from the state in which the display image G14 is displayed, if the display is switched to the 2D image G20, there is a risk of causing a feeling of strangeness in the user because the photographic subjects have a different size. Hence, at the time of switching the viewpoint, it is desirable that the display is switchable from the display image G14 directly to the display image G22. For example, in order to switch the display from the display image G14 directly to the display image G22, it is necessary to identify, in the 2D image G20, the size of the range R1 and the position of a center C of the range R1 that is equivalent to the display image G14.

Meanwhile, in the case of switching viewpoints among 360° all-around images; in the image photographed from each viewpoint, since it is possible to calculate the display angle of view (the angle of view for the zoom factor equal to one) at which the photographic subjects appear to be comparable with the real word, the sizes of the photographic subjects can be matched to be comparable before and after the viewpoint switching.

However, in the case of a 2D image, although the photographing and recording may have been done in the zoomed state, it is not always necessary that the information about the angle of view at the time of photographing can be obtained. In that case, the photographed image is further zoomed in/zoomed out for display at the time of reproduction. However, the true zoom factor (the display angle of view) of the currently-displayed image with respect to the real world is equal to the multiplication of the zoom factor at the time of photographing and the zoom factor at the time of reproduction. Thus, if the zoom factor at the time of photographing is unknown, then the true zoom factor of the displayed image with respect to the real world also remains unknown. For that reason, in the use case in which the viewpoint is switched, the sizes of the photographic subjects can no more be matched before and after the switching. Such a phenomenon can occur in the case of switching the viewpoints between a 360° all-around image and a 2D image that are zoomable and rotatable, or in the case of switching the viewpoints among a plurality of 2D images.

In order to ensure that the sizes of the photographic subjects appear to be comparable before and after the viewpoint switching, the value of display magnification of the pre-switching image needs to be obtained and the display magnification of the post-switching image needs to be appropriately set in such a way that the two values are same.

The display magnification of an image viewed by the user is decidable according to three parameters, namely, the angle of view at the time of photographing, the clipping angle of view of the display image from the source image, and the display angle of view of the display device at the time of reproduction. Moreover, regarding the image that is eventually viewed by the user, the true display magnification (i.e., the true display angle of view) with respect to the real world can be calculated as given below.

(true display angle of view)=(angle of view at time of photographing)×(clipping angle of view of display image from source image)×(display angle of view of display device)

In the case of a 360° all-around image, the angle of view is equal to 360° at the time of photographing. Moreover, regarding the clipping angle of view, the corresponding degree of the angle of view can be calculated from the pixel count of the clipping range. Furthermore, the information about the display angle of view of the display device gets decided according to the reproduction environment. Hence, it becomes possible to calculate the definitive display magnification.

On the other hand, in a 2D image, the information about the angle of view at the time of photographing is generally not obtainable or often gets lost during the production stage. Regarding the clipping angle of view, although it can be obtained as the relative position with respect to the source image, the corresponding degree of the angle of view as an absolute value in the real world is not known. Hence, it becomes difficult to obtain the definitive display magnification.

Moreover, in the case of viewpoint switching between a 360° all-around image and a 2D image, the directions of the photographic subjects need to be matched. For that reason, direction information at the time of photographing the 2D image is also required. Meanwhile, if the 360° all-around image is compatible to the OMAF (Omnidirectional Media Application Format) standard, the direction information is recorded as metadata. However, regarding 2D images, the direction information is often not obtainable.

As described above, in the case of viewpoint switching between a 360° all-around image and a 2D image when zooming is also involved, in order to enable matching of the sizes of the photographing subjects, it is necessary to have the angle-of-view information and the direction information at the time of photographing the 2D image.

Meanwhile, in the case of reproducing multi-view content, according to the zooming of images or the viewpoint switching, it is also desirable to appropriately vary the positions of the audio sources (hereinafter, sometimes called audio objects). In MPEG-H 3D Audio mentioned in Non Patent Literature 1, a mechanism is defined for correcting the positions of the audio objects according to the zooming of the video. The explanation of that mechanism is given below.

In MPEG-H 3D Audio, the following two position correction functions regarding the audio objects are provided.

(First correction function): when the display angle of view at the time of content production in which the position adjustment of the image sounds has been performed is different than the display angle of view during reproduction, the positions of the audio objects are corrected.

(Second correction function): the zooming of the video at the time of reproduction is followed and the positions of the audio objects are corrected.

Figure 2:
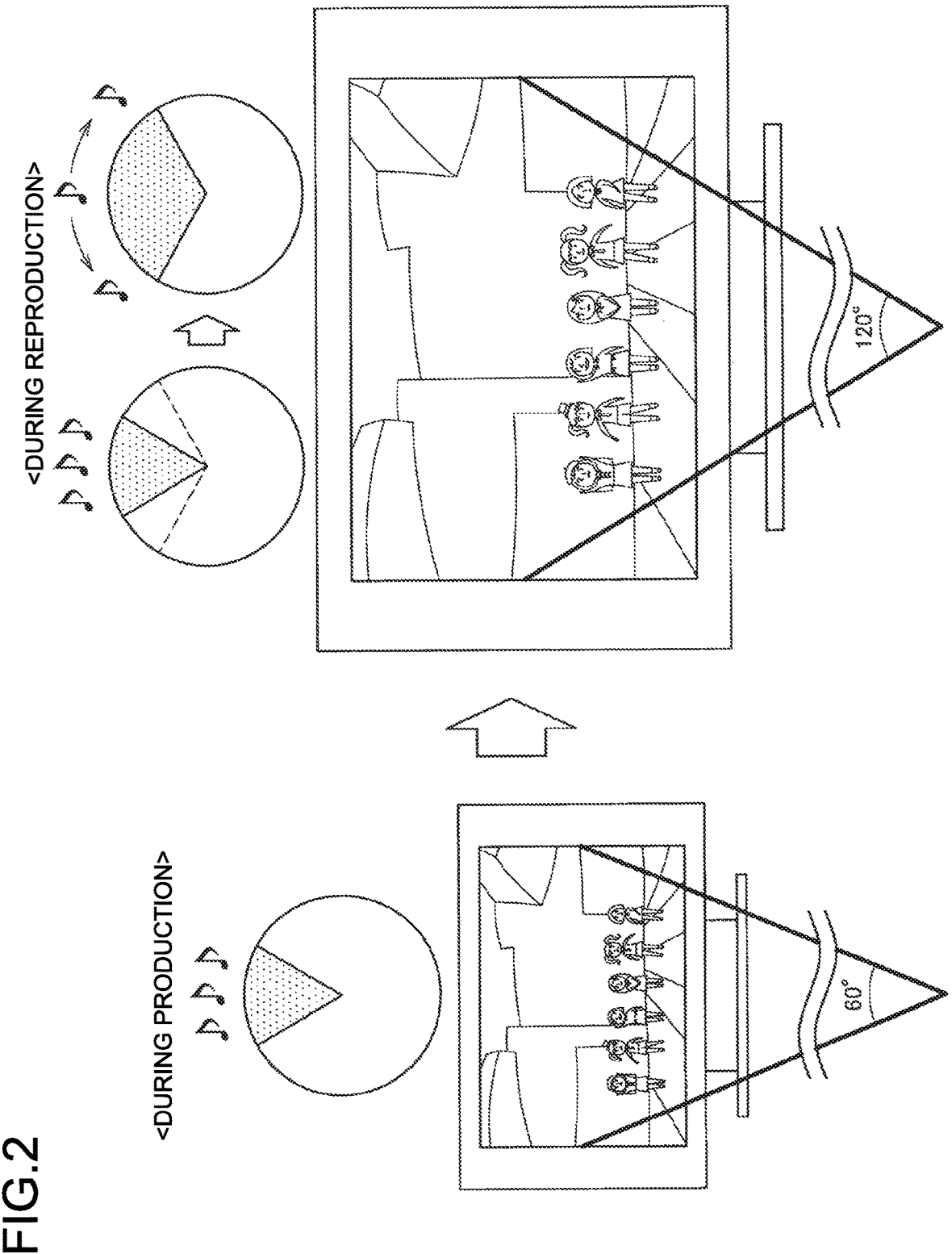
FIG. 2 is an explanatory diagram for explaining the position correction of the audio objects when the display angle of view at the time of content production is different than the display angle of view at the time of content reproduction.

Firstly, explained below with reference to FIG. 2 is the first correction function. FIG. 2 is an explanatory diagram for explaining the position correction of the audio objects when the display angle of view at the time of content production is different than the display angle of view at the time of content reproduction. Meanwhile, strictly speaking, the angle of view of a video reproduced on a spherical surface is different than the angle of view of the video reproduced on a flat display. However, for ease of explanation, those two angles of view are approximated and are treated to be identical.

In the example illustrated in FIG. 2, the display angle of view at the time of content production and the display angle of view at the time of content reproduction are illustrated. In the example illustrated in FIG. 2, the display angle of view at the time of content production is equal to 60° and the display angle of view at the time of content reproduction is equal to 120°.

As illustrated in FIG. 2, for example, while displaying an image having the photographing angle of view of 60° at the display angle of view of 60°, the content producer decides on the position of an audio object. At that time, since the photographing angle of view and the display angle of video are identical, the zoom factor is equal to one. If the target image is a 360° all-around image, since the clipping angle of view (the photographing angle of view) can be decided in accordance with the display angle of view, it becomes easy to display the image at the zoom factor equal to one.

In FIG. 2 is illustrated an example in which the content produced in the abovementioned manner is reproduced at the display angle of view of 120°. When the photographing angle of view of the display image is equal to 60°, the image viewed by the user is practically an enlarged image. Regarding the correction of the position of the audio object in accordance with the enlarged image, the information and the API are defined in MPEG-H 3D Audio.

Explained below with reference to FIGS. 3 and 4 is the second correction function. FIGS. 3 and 4 are explanatory diagrams for explaining about the correction of the positions of the audio objects by following the zooming of the video at the time of reproduction. Regarding the 360° all-around image G10 illustrated in FIGS. 3 and 4, the horizontal pixel count is 3840 pixels that is equivalent to the angle of view of 360°. Moreover, it is assumed that the zoom factor at the time of photographing the 360° all-around image G10 is equal to one. Furthermore, it is assumed that the position of the audio object is set in accordance with the 360° all-around image G10. Meanwhile, for the sake of simplicity, in the examples illustrated in FIGS. 3 and 4, the display angle of view at the time of content production is assumed to be identical to the display angle of view at the time of content reproduction; the position correction of the audio object at the time of production is assumed to be not required as explained with reference to FIG. 2; and only correction that is assumed to be performed is the correction attributed to zooming during reproduction.

In FIG. 3 is illustrated an example in which the reproduction is performed at the zoom factor equal to one. If the angle of view at the time of reproduction is assumed to be 67.5°; then, in order to display the image at the zoom factor equal to one, a range of 720 pixels equivalent to the photographing angle of view of 67.5° can be clipped for display from the 360° all-around image G10 illustrated in FIG. 3. In this way, in the case of reproducing the image at the zoom factor equal to one, there is no need to perform position correction of the audio objects.

In FIG. 4 is illustrated an example in which the reproduction is performed at the zoom factor equal to two. If the angle of view at the time of reproduction is assumed to be 67.5°; then, in order to display the image at the zoom factor equal to two, a range of 360 pixels equivalent to the photographing angle of view of 33.75° can be clipped for display from the 360° all-around image G10 illustrated in FIG. 4. Herein, regarding the correction of the position of the audio object in accordance with the zoom factor of the image, the information and the API are defined in MPEG-H 3D Audio.

These two position correction functions regarding the audio objects are provided in MPEG-H 3D Audio. However, in the position correction functions regarding the audio objects as provided in MPEG-H 3D Audio, there are times when the position correction of the audio objects cannot be appropriately performed at the time of viewpoint switching involving zooming.

Explained below with reference to FIGS. 5 to 7 is the position correction of the audio objects as required in the use cases about viewpoint switching involving zooming.

FIG. 5 is an explanatory diagram for explaining about the position correction of the audio objects when viewpoint switching is not performed. As illustrated in FIG. 5, a photographing angle of view $\theta$ represents the angle of view at the time of photographing the 2D image G20. However, in the example illustrated in FIG. 5, it is assumed that the information about the photographing angle of view $\theta$ can neither be obtained at the time of content production nor be obtained at the time of content reproduction.

In the example illustrated in FIG. 5, at the time of content production, it is assumed that the display angle of view is equal to 90°, and that the 2D image G20 is displayed without modification at the zoom factor equal to one. Herein, since the photographing angle of view $\theta$ cannot be obtained at the time of content production, the true display magnification with respect to the real world is unknown.

In the example illustrated in FIG. 5, at the time of reproduction, it is assumed that the display angle of view is equal to 60°, and that, for example, a range R2 illustrated in FIG. 5 is clipped and a display image G24 is displayed at the zoom factor equal to two. Herein, at the time of reproduction too, since the photographing angle of view $\theta$ cannot be obtained, the true display magnification with respect to the real world is unknown. However, when images of the same viewpoint are displayed, even if the true display magnification is unknown, the positions of the audio objects can be corrected using the position correction functions for audio objects as provided in MPEG-H 3D Audio. Hence, the reproduction can be performed while maintaining the relative positional relationship between the images and the audios.

FIG. 6 is an explanatory diagram for explaining about the position correction of the audio objects when viewpoint switching is performed. In the example illustrated in FIG. 6, viewpoint switching is performed between a 360° all-around image and a 2D image that are photographed from different viewpoints.

In the example illustrated in FIG. 6, at the time of reproducing a 2D image, in an identical manner to the example illustrated in FIG. 5, it is assumed that the display angle of view is equal to 60° and that the display image G24 obtained by clipping a range from the source 2D image is displayed at the zoom factor equal to two. Moreover, in an identical manner to the example illustrated in FIG. 5, it is assumed that the photographing angle of view θ cannot be obtained, and that the true display magnification with respect to the real world is unknown.

In the example illustrated in FIG. 6, the case of performing viewpoint switching to the viewpoint for the 360° all-around image is considered. Since there is no change in the display angle of view, it remains equal to 60°. At the time of reproducing the 360° all-around image, if it is attempted to display the image while maintaining the zoom factor at two; for example, it is possible to obtain the display image G14 by clipping a range R3 from the 360° all-around image G10 at the clipping angle of view equal to 30°. Herein, the zoom factor at the time of reproduction of a 360° all-around image is also the true display magnification with respect to the real world, and thus the true display magnification with respect to the real world is two.

However, as explained above, the true display magnification with respect to the real world is unknown at the time of reproducing a 2D image. Thus, in the viewpoint switching performed as explained above, the display magnification with respect to the real world at the time of reproduction of a 2D image is not necessary identical to the display magnification with respect to the real world at the time of reproduction of a 360° all-around image. For that reason, in the viewpoint switching performed as explained above, the sizes of the photographic subjects do not match.

Moreover, regarding the positions of the audio objects too, there occurs a mismatch before and after the viewpoint switching and that may cause a feeling of strangeness in the user. Hence, it is desirable that, before and after the viewpoint switching, the sizes of the photographic subjects are matched and the positions of the audio objects are also corrected.

FIG. 7 is an explanatory diagram for explaining about the position correction of the audio objects when the photographing angle of view is not identical to the display angle of view at the time of content production.

In the example illustrated in FIG. 7, it is assumed that the display angle of view at the time of content production is equal to 80° and that the 2D image G20 is displayed without modification at the zoom factor equal to one. Moreover, it is assumed that the photographing angle of view is unknown at the time of content production. Thus, the photographing angle of view is not necessarily identical to the display angle of view at the time of content production. Since the photographing angle of view is unknown, the true display magnification with respect to the real world is unknown, and there is risk that the positions of the audio positions are decided with reference to an image having such a zoom factor that the true display magnification with respect to the real world is not equal to one.

Moreover, in the example illustrated in FIG. 7, at the time of reproduction, it is assumed that the display angle of view is equal to 60° and the image is displayed at the zoom factor equal to two. Moreover, at the time of reproduction too, it is assumed that the photographing angle of view is unknown. As a result, the true display magnification with respect to the real world is unknown.

In FIG. 7 is illustrated an example in which, at the time of reproduction, the clipping range is moved while maintaining the zoom factor at two. In FIG. 7, an example is illustrated in which the display image G24 obtained by clipping the range R2 from the 2D image G20 is displayed, and an example is illustrated in which a display image G26 obtained by clipping a range R4 from the 2D image G20 is displayed.

Meanwhile, as explained above, when the position of the audio position is decided with reference to an image having such a zoom factor that the true display magnification with respect to the real world is not equal to one, the angle of rotation of the display images G24 and G24, which are displayed at the time of reproduction, with respect to the real world is unknown. As a result, the angle of movement of the audio object, which has moved according to the movement of the clipping range, with respect to the real world also remains unknown.

However, at the time of moving from the state in which the display image G24 is displayed to the state in which the display image G26 is displayed; as explained with reference to FIG. 5, the position of the audio object can be corrected using the position correction functions regarding audio objects as provided in MPEG-H 3D Audio. In this way, when the images have the same viewpoint, even if the angle of movement with respect to the real world is not known, the positions of the audio objects can be corrected. However, when the viewpoint is switched to another viewpoint, correcting the positions of the audio objects becomes difficult with the angle of rotation with respect to the real world remaining unknown. As a result, a mismatch occurs in the sound positions before and after the viewpoint switching, and there a risk of causing a feeling of strangeness in the user.

2. Principle of Concerned Technology

In that regard, keeping the state of things explained above as one of the points in focus, the embodiments of the application concerned were created. According to the embodiments described below, the positions of the audio objects can be corrected also in the case of switching among a plurality of viewpoints, and the feeling of strangeness in the user can be reduced. The following explanation is given about the fundamental principle of the technology according to the application concerned (hereinafter, also called the concerned technology) that is common to all embodiments of the application concerned.

<<2-1. Overview of Concerned Technology>>

FIG. 8 is an explanatory diagram for explaining the overview of the concerned technology. In FIG. 8 are illustrated the display image G12, the 2D image G20, and a 2D image G30. The display image G12 can be an image clipped from a 360° all-around image as explained earlier with reference to FIG. 1. Herein, the 360° all-around image used for clipping the display image G12; the 2D image G30; and the 2D image G30 are images photographed from mutually different viewpoints.

From the state in which the display image G12 is displayed, when a display image G16 that is obtained by clipping a range R5 of the display image G12 is displayed, deterioration may occur in the image quality. In that regard, it is considered to switch to the viewpoint for the 2D image G20. At that time, in the concerned technology, after switching the viewpoint, instead of displaying the entire 2D image G20; a range R6 that, in the 2D image G20, is equivalent to the display image G16 is automatically identified, and the display image G24 is displayed in which the sizes of the photographic subjects are maintained. Moreover, in the concerned technology, also at the time of switching from the viewpoint for the 2D image G20 to the viewpoint for the 2D image G30, the sizes of the photographic subjects are maintained. In the example illustrated in FIG. 8, at the time of switching from the viewpoint for the 2D image G20 to the viewpoint for the 2D image G30, instead of displaying the entire 2D image G30; a range R7 that, in the 2D image G30, is equivalent to the display image G24 is identified, and a display image G32 is displayed in which the sizes of the photographic subjects are maintained. With such a configuration, it becomes possible to reduce the feeling of strangeness caused to the vision of the user.

Furthermore, in the concerned technology, in the case of switching among viewpoints, the positions of the audio objects are corrected, and the reproduction is performed at the audio source positions in accordance with the viewpoint switching. With such a configuration, it becomes possible to reduce the feeling of strangeness caused to the vision of the user.

In order to achieve the effects explained with reference to FIG. 8, in the concerned technology, information to be used in the switching of viewpoints is kept ready at the time of content production, and the same information is shared also at the time of generating a content file and at the time of reproduction. In the following explanation, the information to be used in the switching of viewpoints is called multi-view zoom switching information or is simply called viewpoint switching information. The multi-view zoom switching information represents information that, in the case of switching among a plurality of viewpoints, enables performing the display while maintaining the sizes of the photographic subjects. Moreover, the multi-view zoom switching information also represents information that, in the case of switching among a plurality of viewpoints, enables correction of the positions of the audio objects. Given below is the explanation about the multi-view zoom switching information.

<<2-2. Multi-View Zoom Switching Information>>

Figure 10:
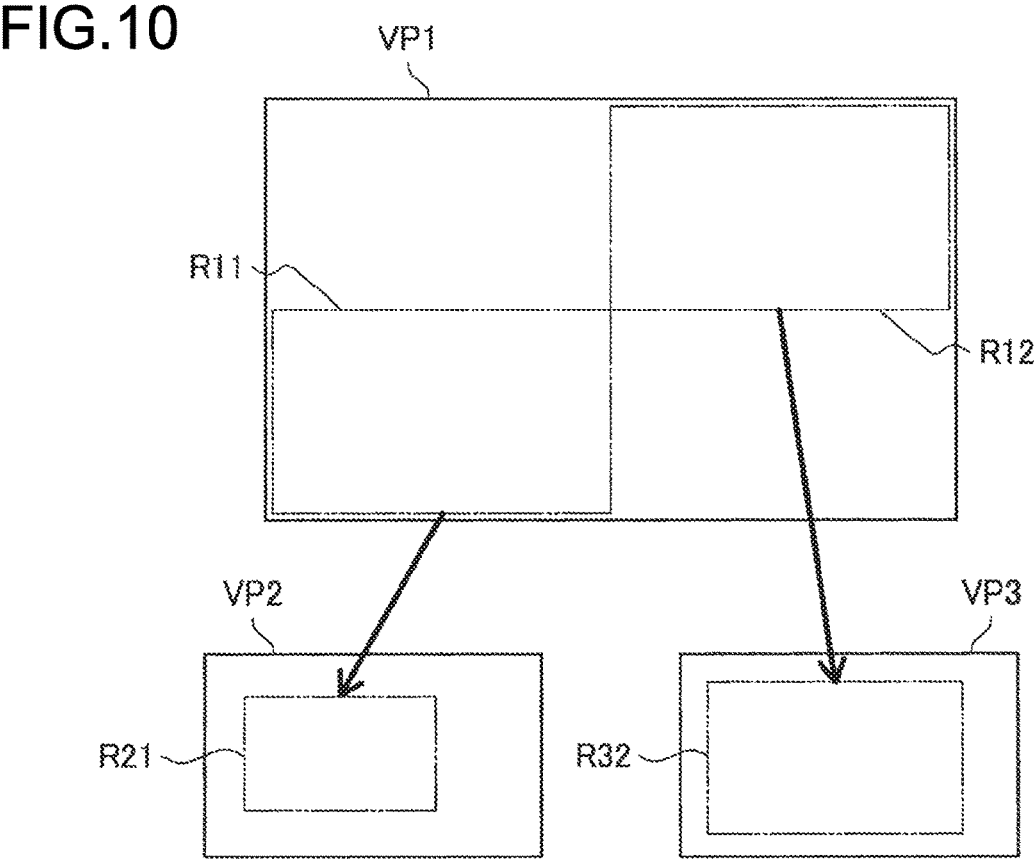
FIG. 10 is a schematic diagram for explaining the multi-view zoom switching information.

Explained below with reference to FIGS. 9 and 10 is an example of the multi-view zoom switching information. FIG. 9 is a table illustrating an example of the multi-view zoom switching information. FIG. 10 is a schematic diagram for explaining the multi-view zoom switching information.

As illustrated in FIG. 9, the multi-view zoom switching information can contain image type information, photographing related information, angle-of-view information for content production, number of sets of switching destination viewpoint information, and switching destination viewpoint information. The multi-view zoom switching information illustrated in FIG. 9 can be provided, for example, in a corresponding manner to each viewpoint included in the multi-view content. In FIG. 9 is illustrated an example of the values of the multi-view zoom switching information that correspond to a viewpoint VP illustrated in FIG. 10.

The image type information represents information indicating the type of the image photographed from the viewpoint that is associated to concerned the multi-view zoom switching information. For example, the image type information can indicate whether the image is a 2D image, a 360° all-around image, or some other type of image.

The photographing related information represents information at the time of photographing an image from the viewpoint that is associated to the concerned multi-view zoom switching information. For example, the photographing related information contains photographing position information related to the position of the camera that photographed the image. Moreover, the photographing related information contains photographing angle-of-view information related to the angle of view (the horizontal angle of view and the vertical angle of view) of the camera that photographed the image.

The angle-of-view information for content production represents information about the display angle of view (the horizontal angle of view and the vertical angle of view) at the time of content production. Moreover, the angle-of-view information for content production also represents reference angle-of-view information related to the angle of view of the screen that was referred to at the time of deciding on the position information of the audio objects related to the viewpoint associated to the concerned viewpoint switching information. Furthermore, the angle-of-view information for contents production can also represent information equivalent to mae_ProductionScreenSizeData( ) in MPEG-H 3D Audio.

As a result of using the photographing related information and the angle-of-view information for content production, not only it becomes possible to perform the display while maintaining the sizes of the photographic subjects in the case of viewpoint switching, but it also becomes possible to correct the positions of the audio objects.

The switching destination viewpoint information represents information related to the switching destination viewpoints to which switching is possible from the viewpoint associated to the concerned multi-view zoom switching information. As illustrated in FIG. 9, the multi-view zoom switching information contains the number of listed sets of switching destination viewpoint information; and accordingly the viewpoint VP1 illustrated in FIG. 10 is switchable to two viewpoints VP2 and VP3.

The switching destination viewpoint information can be, for example, information enabling switching to the switching destination viewpoints. In the example illustrated in FIG. 9, each set of the switching destination viewpoint information contains information related to the target region for viewpoint switching (i.e., the top left x-coordinate, the top left y-coordinate, the horizontal width, and the vertical width); threshold value information regarding the threshold value for switching; and viewpoint identification information of the concerned switching destination viewpoint.

For example, in the example illustrated in FIG. 10, a region R11 represents the region meant for switching from the viewpoint VP1 to the viewpoint VP2. The region R11 of the viewpoint VP1 corresponds to a region R21 of the viewpoint VP2. Moreover, in the example illustrated in FIG. 10, a region R12 represents the region meant for switching from the viewpoint VP1 to the viewpoint VP2. The region R12 of the viewpoint VP1 corresponds to a region R32 of the VP2.

The threshold information can be, for example, the information about the maximum display magnification. For example, in the region R11 of the viewpoint VP1, when the display magnification becomes equal to or greater than three, the viewpoint is switched to the viewpoint VP2. Moreover, in the region R12 of the viewpoint VP1, when the display magnification becomes equal to or greater than two, the viewpoint is switched to the viewpoint VP3.

Figure 11:
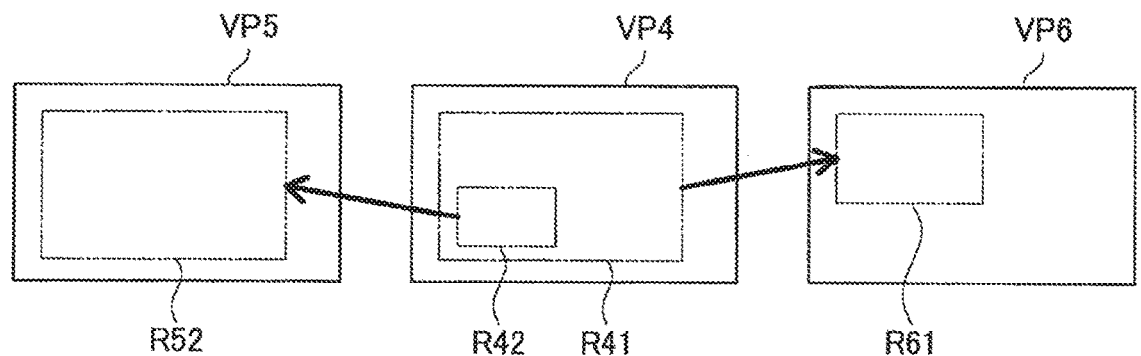
FIG. 11 is an explanatory diagram for explaining a modification example of the multi-view zoom switching information.
Figure 12:
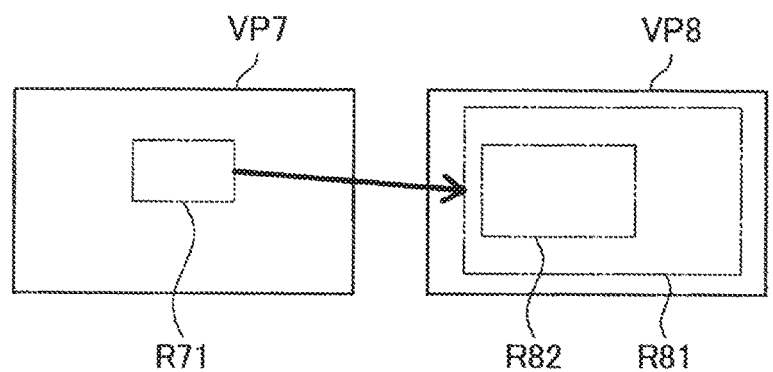
FIG. 12 is an explanatory diagram for explaining a modification example of the multi-view zoom switching information.

Till now, the explanation with reference to FIGS. 9 and 10 was given about an example of the multi-view zoom switching information. However, the information included in the multi-view zoom switching information is not limited to the example given above. Given below is the explanation of some modification examples of the multi-view zoom switching information. FIGS. 11 and 12 are explanatory diagrams for explaining the modification examples.

For example, the switching destination viewpoint information can be set in a multistage manner. Alternatively, the switching destination viewpoint information can be set in a manner enabling mutual switching between viewpoints. For example, the setting can be such that mutual switching is possible between the viewpoints VP1 and VP2, and mutual switching is possible between the viewpoints VP1 and VP3.

Moreover, the switching destination viewpoint information can be set in such a way that the movement between viewpoints can be performed via different paths. For example, the setting can be such that the viewpoint VP1 is switchable to the viewpoint VP2, the viewpoint VP2 is switchable to the viewpoint VP3, and the viewpoint VP3 is switchable to the viewpoint VP1.

Furthermore, when mutual switching between viewpoints is possible, the switching destination viewpoint information can be set to have different threshold value information depending on the direction of switching, so that hysteresis can be provided. For example, the threshold value information can be set in such a way that the threshold value for switching from the viewpoint VP1 to the viewpoint VP2 is three, and the threshold value for switching from the viewpoint VP2 to the viewpoint VP1 is two. Such a configuration makes it difficult to have frequent occurrence of viewpoint switching, thereby enabling reducing the feeling of strangeness of the user.

Meanwhile, there can be overlapping of regions in the switching destination viewpoint information. In the example illustrated in FIG. 11, switching is possible from the viewpoint VP4 to either the viewpoint VP5 or the viewpoint VP6. In the viewpoint VP4, a region R41 that is meant for switching from the viewpoint VP4 to a region R61 of the viewpoint VP6 also includes a region R42 that is meant for switching from the viewpoint VP4 to a region R52 of the viewpoint VP5. Thus, there is overlapping of regions.

Moreover, the threshold value information included in the switching destination viewpoint information not only can represent the information about the maximum display magnification but can also represent the information about the minimum display magnification. For example, in the example illustrated in FIG. 11, since the viewpoint VP6 is more of an overview as compared to the viewpoint VP4, the threshold value information regarding switching from the region R41 of the viewpoint VP4 to the region R61 of the viewpoint VP6 can represent the information about the minimum display magnification. With such a configuration, the intention of the content producer, such as the intended range of display magnification to be used for the display from the concerned viewpoint or the intention of switching the viewpoint when that display magnification is exceeded, can be communicated to the reproduction side.

Furthermore, even in a region for which the switching destination viewpoint is not set, the maximum display magnification or the minimum display magnification can be set. In that case, the zoom variation can be stopped at the maximum display magnification or the minimum display magnification.

Moreover, when the image corresponding to a switching destination viewpoint is a 2D image, information about the default initial display range to be displayed immediately after the switching can be included in the switching destination viewpoint information. As described later, although it is possible to calculate the display magnification for the switching destination viewpoints, the content producer can also be allowed to intentionally set the range for default display from each switching destination viewpoint. For example, in the example illustrated in FIG. 12, in the case of switching from a region R71 of a viewpoint VP7 to a viewpoint VP8; although a region R82 represents the clipping range in which the photographic subjects have comparable sizes to the pre-switching sizes, a region R81 representing the initial display range may be displayed. Meanwhile, when the information about the initial display range is included in the switching destination viewpoint information, the information about the clipping center and the display magnification corresponding to the initial display range can also be included in the switching destination viewpoint information; in addition to including the information about regions, the threshold value information, and the viewpoint identification information in the switching destination viewpoint information.

Figure 13:
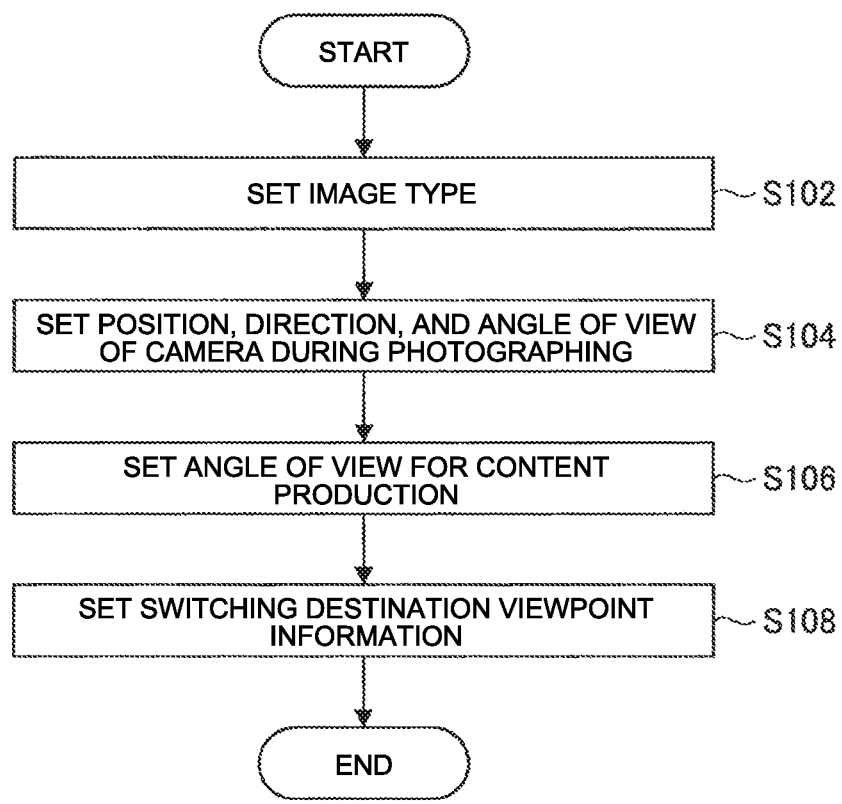
FIG. 13 is a flowchart for explaining an example of the flow of generating the multi-view zoom switching information at the time of content production.

FIG. 13 is a flowchart for explaining an example of the flow of generating the multi-view zoom switching information at the time of content production. Firstly, for example, at the time of content production, when the content producer operates a device to be used for content production according to the embodiments of the application concerned, the generation of multi-view zoom switching information as illustrated in FIG. 13 can be carried out for each viewpoint included in the multi-view content.

Firstly, the image type is set, and the image type information is assigned (S102). Then, the position, the direction, and the angle of view of the camera during photographing are set; and the photographing related information is assigned (S104). Meanwhile, at Step S104, the photographing related information can be set by referring to the position, the direction, and the zoom value of the camera at the time of photographing, and by referring to the 360° all-around images being simultaneously photographed.

Subsequently, the angle of view for content production is set, and the angle-of-view information for content production is assigned (S106). As explained earlier, the angle-of-view information for content production represents the screen size (the display angle of view of the screen) that was referred to at the time of deciding on the positions of the audio objects. For example, in order to eliminate the effects of misalignment attributed to zooming; at the time of content production, the images can be displayed in the full-screen mode without performing clipping.

Then, the switching destination viewpoint information is set (S108). The content producer sets a region in the image corresponding to each viewpoint; and sets the display magnification threshold value for viewpoint switching and sets the identification information of the viewpoint switching destinations.

Figure 14:
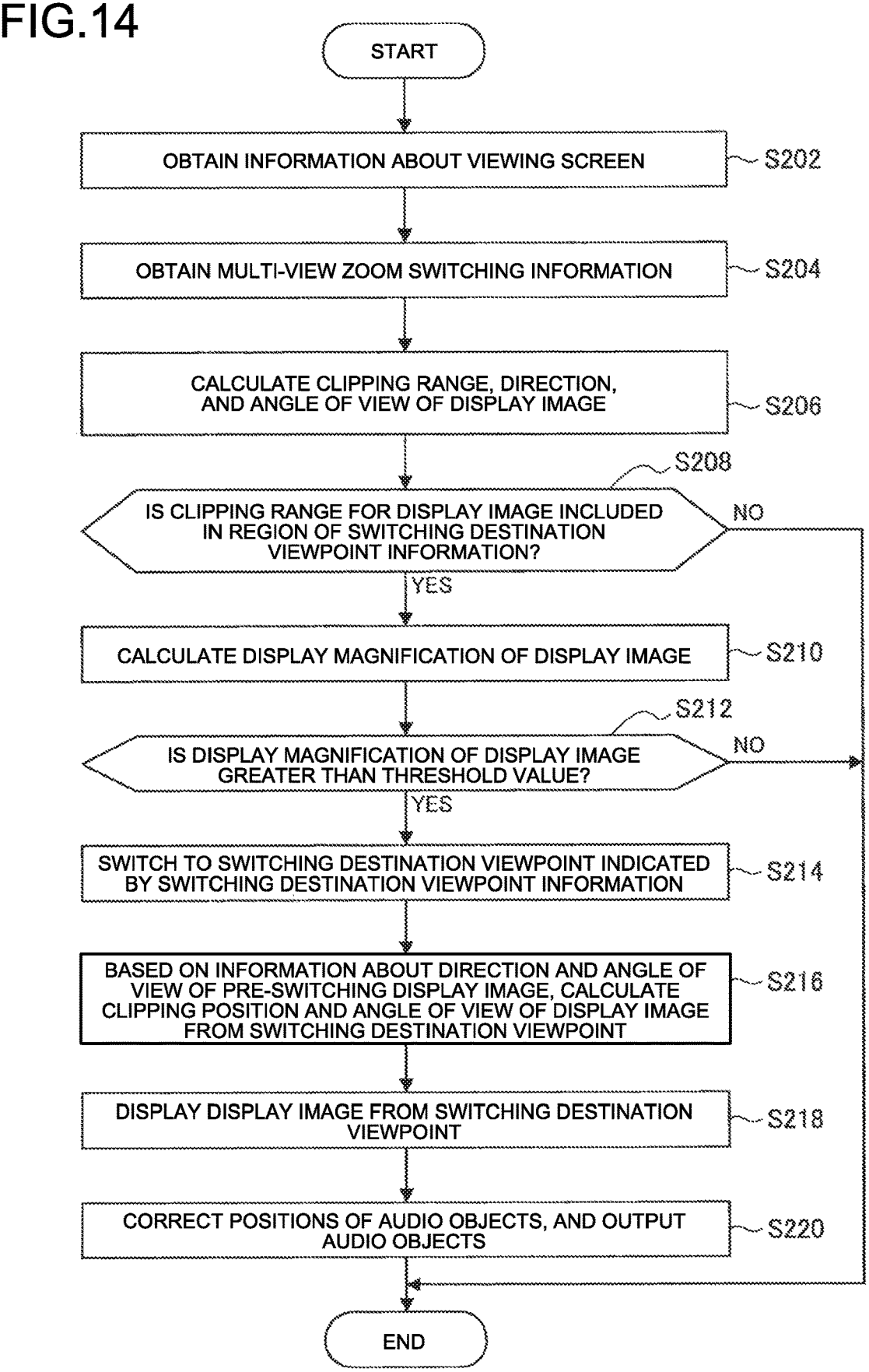
FIG. 14 is a flowchart for explaining an example of the flow of viewpoint switching performed at the time of reproduction using the multi-view zoom switching information.

Till now, the explanation was given about the flow of generating the multi-view zoom switching information at the time of content production. The generated multi-view zoom switching information is then included in a content file or a metadata file as described later, and is provided to the device to be used for reproduction according to the embodiments of the application concerned. Explained below with reference to FIG. 14 is a flow of viewpoint switching performed at the time of reproduction using the multi-view zoom switching information. FIG. 14 is a flowchart for explaining an example of the flow of viewpoint switching performed at the time of reproduction using the multi-view zoom switching information.

Firstly, information is obtained about the viewing screen to be used in the reproduction (S202). The information about the viewing screen can indicate the display angle of view from the viewing position, or can be uniquely decided according to the reproduction environment.

Then, the multi-view zoom switching information related to the viewpoint for the currently-displayed image is obtained (S204). As described later, the multi-view zoom switching information is stored in a metadata file or in a content file. Regarding the method for obtaining the multi-view zoom switching information according to the embodiments of the application concerned, the explanation is given later.

Subsequently, the information about the clipping range for the display image, the direction of the display image, and the angle of view of the display image are calculated (S208). Meanwhile, the information about the clipping range for the display image can contain, for example, the information about the center position and the size of the clipping range.

Then, it is determined whether or not the clipping range for the display image, which is calculated at Step S208, is included in any region of the switching destination viewpoint information included in the multi-view zoom switching information (S210). If the clipping range for the display image is not included in any region (NO at S210), then the viewpoint switching is performed, and it marks the end of the flow.

Subsequently, the display magnification of the display image is calculated (S210). For example, the display magnification of the display image can be calculated based on the size of the pre-clipping image and the information about the clipping range for the display image. Then, the display magnification of the display image is compared with the display magnification threshold value included in the switching destination viewpoint information (S212). In the example illustrated in FIG. 14, the threshold value information indicates the maximum display magnification. If the display magnification of the display image is equal to or smaller than the threshold value (NO at S212), the viewpoint switching is not performed, and it marks the end of the flow.

On the other hand, if the display magnification of the display image is greater than the threshold value (YES at S212), switching to the switching destination viewpoint, which is indicated by the switching destination viewpoint information, is started (S214). Based on the information about the direction and the angle of view of the pre-clipping display image, based on the photographing related information included in the multi-view zoom switching information, and based on the angle-of-view information for content reproduction; the clipping position and the angle of view of the display image from the switching destination viewpoint are calculated (S216).

Then, based on the information about the clipping position and the angle of view as calculated at Step S216, the display image from the switching destination viewpoint is clipped and displayed (S218). Moreover, based on the information about the clipping position and the angle of view as calculated at Step S216, the positions of the audio objects are corrected, and the audio is output (S220).

Till now, the explanation was given about the fundamental principle of the technology according to the application concerned that is common to all embodiments of the application concerned. Given below is the specific explanation of each embodiment of the application concerned.

3. First Embodiment

3-1. Configuration Example (System Configuration)

Figure 15:
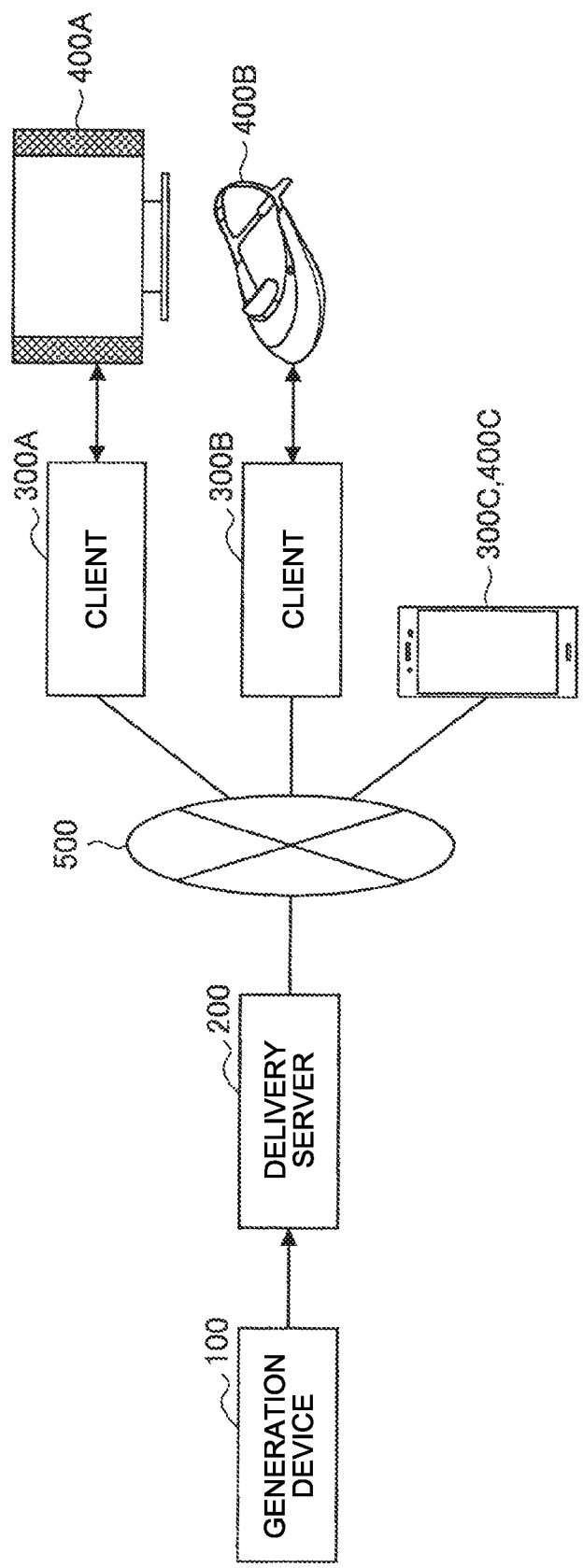
FIG. 15 is a diagram illustrating a system configuration of an information processing system according to a first embodiment of the application concerned.

FIG. 15 is a diagram illustrating a system configuration of an information processing system according to a first embodiment of the application concerned. The information processing system according to the first embodiment illustrated in FIG. 15 is a system for performing streaming delivery of multi-view content and can perform streaming delivery using, for example, MPEG-DASH for which the standard definition is given in ISO/IEC 23009-1. As illustrated in FIG. 15, the information processing system according to the first embodiment includes a generation device 100, a delivery server 200, client devices 300, and output devices 400. The delivery server 200 is connected to the client devices 300 by a communication network 500.

The generation device 100 is an information processing device that generates content files and metadata files compliant to the streaming delivery performed using MPEG-DASH. Meanwhile, the generation device 100 according to the first embodiment can be used in content production (for deciding on the positions of the audio objects); or can receive image signals, audio signals, and the position information of the audio objects from some other device meant for content production. Regarding a configuration of the generation device 100, the explanation is given later with reference to FIG. 16.

The delivery server 200 is an information processing device that functions as an HTTP server and performs streaming delivery using MPEG-DASH. For example, based on MPEG-DASH, the delivery server 200 performs streaming delivery of content files and metadata files, which are generated by the generation device 100, to the client devices 300. Regarding a configuration of the delivery server 200, the explanation is given later with reference to FIG. 17.

The client devices 300 are information processing devices that receive the content files and the metadata files, which are generated by the generation device 100, from the delivery server 200; and perform reproduction. In FIG. 15, examples of the client devices 300 include a client device 300A connected to a mounted-type output device 400A; a client device 300B connected to an output device 400B wearable by a user; and a client device 300C that is a terminal also functioning as an output device 400C. Regarding the configurations of the client devices 300, the explanation is given later with reference to FIGS. 18 to 20.

The output devices 400 are devices that, as a result of the reproduction control performed by the client devices 300, display the display images and output the audio. In FIG. 15, examples of the output devices 400 include the mounted-type output device 400A; the output device 400B wearable by a user; and the output device 400C that is a terminal also functioning as the client device 300C.

The output device 400A can be, for example, a television set. The user can be allowed to perform operations such as zooming and rotation via a controller that is connected to the output device 400A, and the information about the operations can be sent from the output device 400A to the client device 300A.

The output device 400B can be an HMD (Head Mounted Display) wearable on the head portion of a user. The output device 400B has a sensor for obtaining the information such as the position and the direction (attitude) of the head portion of the user wearing the output device 400B, and that information can be sent from the output device 400B to the client device 300B.

The output device 400C can be mobile display terminal such as a smartphone or a tablet, and has a sensor for obtaining the information such as the position and the direction (orientation) when, for example, the user moves the output device 400C by holding it in a hand.

Till now, the explanation was given about an exemplary system configuration of the information processing system according to the first embodiment. The configuration explained with reference to FIG. 15 is only exemplary, and the configuration of the information processing system according to the first embodiment is not limited to the example explained above. Alternatively, some of the functions of the generation device 100 can be provided in the delivery server 200 or in some other external device. Thus, the configuration of the information processing system according to the first embodiment can be flexibly modified according to the specifications and the operations.

(Functional Configuration of Generation Device)

Figure 16:
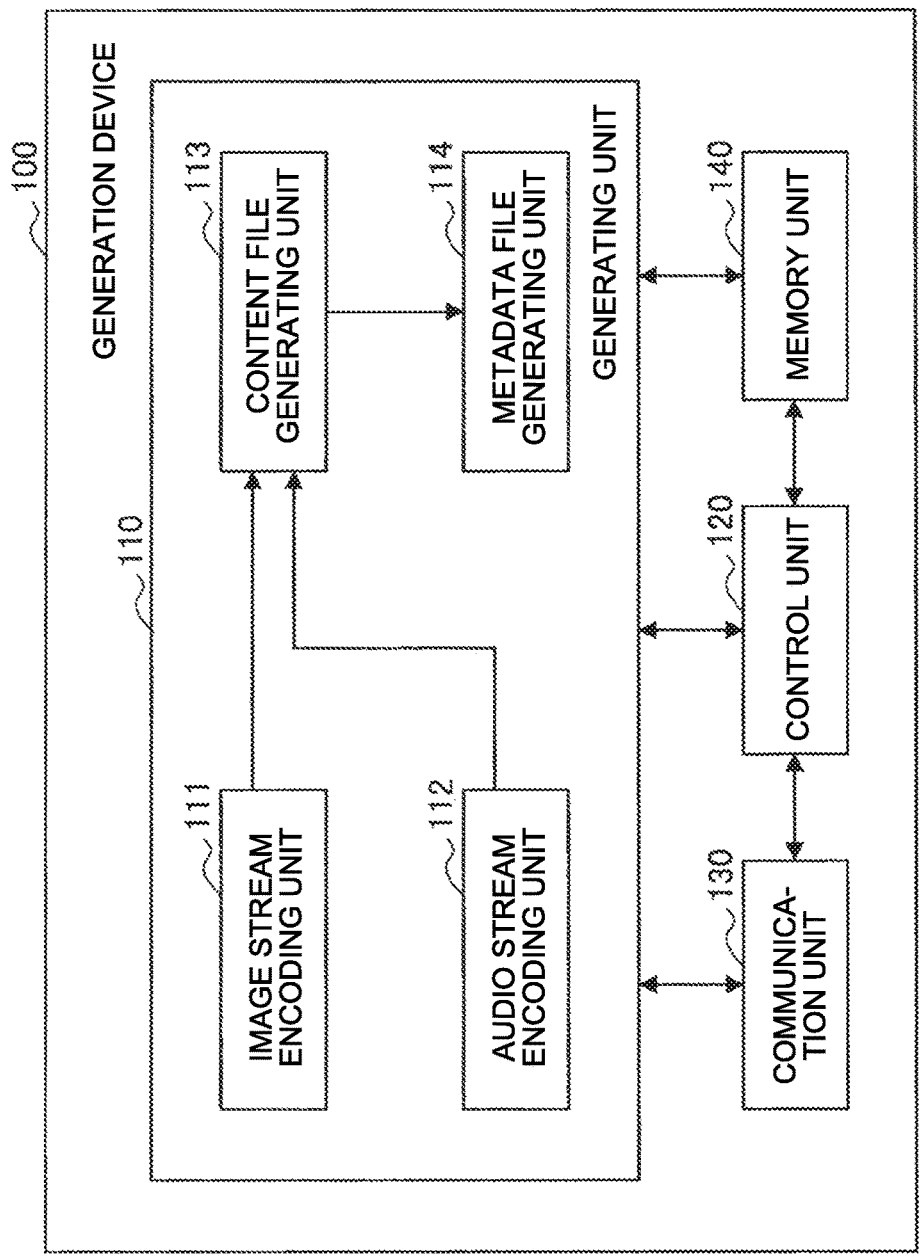
FIG. 16 is a block diagram illustrating an exemplary functional configuration of a generation device 100 according to the first embodiment.

FIG. 16 is a block diagram illustrating an exemplary functional configuration of the generation device 100 according to the first embodiment. As illustrated in FIG. 16, the generation device 100 according to the first embodiment includes a generating unit 110, a control unit 120, a communication unit 130, and a memory unit 140.

The generating unit 110 performs operations related to images and audio, and generates content files and metadata files. As illustrated in FIG. 16, the generating unit 110 functions as an image stream encoding unit 111, an audio stream encoding unit 112, a content file generating unit 113, and a metadata file generating unit 114.

The image stream encoding unit 111 obtains image signals of a plurality of viewpoints (multi-view image signals) from other devices via the communication unit 130 or from the memory unit 140 of the generation device 100; obtains photographing parameters (for example, the photographing related information); and then performs encoding. Subsequently, the image stream encoding unit 111 outputs the image stream and the photographing parameters to the content file generating unit 113.

The audio stream encoding unit 112 obtains object audio signals and the position information of each audio object from other devices via the communication unit 130 or from the memory unit 140 of the generation device 100; and then performs encoding. Subsequently, the audio stream encoding unit 112 outputs audio streams to the content file generating unit 113.

The content file generating unit 113 generates content files based on the image stream encoding unit 111 and the audio stream encoding unit 112. The content files generated by the content file generating unit 113 can be, for example, MP4 files. The following explanation is given mainly about the example in which the content file generating unit 113 generates MP4 files. In the present written description, an MP4 file can be an ISO Base Media File Format (ISOBMFF) file for which the standard definition is given in ISO/IEC 14496-12.

Alternatively, an MP4 file generated by the content file generating unit 113 can be a segment file representing data in the units deliverable using MPEG-DASH.

Then, the content file generating unit 113 outputs the generated MP4 files to the communication unit 130 and the metadata file generating unit 114.

The metadata file generating unit 114 generates metadata files, which include the multi-view zoom switching information, based on the MP4 files generated by the content file generating unit 113. A metadata file generated by the metadata file generating unit 114 can be an MPD (Media Presentation Description) file for which the standard definition is given in ISO/IEC 23009-1.

The metadata file generating unit 114 according to the first embodiment can store the multi-view zoom switching information in a metadata file. Moreover, the metadata file generating unit 114 can store, in a metadata file, the multi-view zoom switching information in a corresponding manner to each of a plurality of switchable viewpoints (i.e., the viewpoints of the multi-view content). Regarding the examples of storing the multi-view zoom switching information in a metadata file, the explanation is given later.

Then, the metadata file generating unit 114 outputs the generated MPD file to the communication unit 130.

The control unit 120 is a functional configuration that comprehensively controls the overall operations performed by the generation device 100. Meanwhile, there is no particular restriction on the details of the control performed by the control unit 120. For example, the control unit 120 can also control the operations that are commonly performed in a general-purpose computer, a PC, or a tablet PC.

When the generation device 100 is used in content production, the control unit 120 can follow the user operation performed using an operating unit (not illustrated), and can generate the position information of object audio data as well as generate the multi-view zoom switching information explained earlier with reference to FIG. 13.

The communication unit 130 performs a variety of communication with the delivery server 200. For example, the communication unit 130 sends the MP4 files and the MPD files, which are generated by the generating unit 110, to the delivery server 200. However, the details of communication performed by the communication unit 130 are not limited to the abovementioned details.

The memory unit 140 is a functional configuration for storing a variety of information. For example, the memory unit 140 is used to store the multi-view zoom switching information, the multi-view image signals, the audio object signals, the MP4 files, and the MPD files; and is used to store the programs and the parameters to be used by the functional configurations of the generation device 100. However, the information stored in the memory unit 140 is not limited to the abovementioned details.

(Functional Configuration of Delivery Server)

Figure 17:
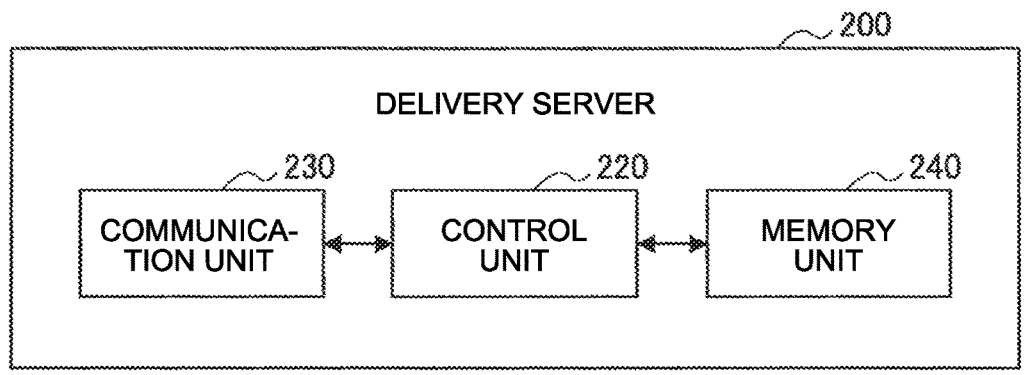
FIG. 17 is a block diagram illustrating an exemplary functional configuration of a delivery server 200 according to the first embodiment.

FIG. 17 is a block diagram illustrating an exemplary functional configuration of the delivery server 200 according to the first embodiment. As illustrated in FIG. 17, the delivery server 200 according to the first embodiment includes a control unit 220, a communication unit 230, and a memory unit 240.

The control unit 220 is a functional configuration that comprehensively controls the overall operations performed by the delivery server 200, and performs control related to the streaming delivery using MPEG-DASH. For example, based on request information received from the client devices 300 via the communication unit 230, the control unit 220 sends a variety of information stored in the memory unit 240 to the client devices 300 via the communication unit 230. Meanwhile, there is no particular restriction on the details of the control performed by the control unit 220. For example, the control unit 220 can also control the operations that are commonly performed in a general-purpose computer, a PC, or a tablet PC.

The communication unit 230 performs a variety of communication between the delivery server 200 and the client devices 300. For example, the communication unit 230 receives the MP4 file and the MPD file from the delivery server 200. Moreover, in response to the requests received from the client devices 300, the communication unit 230 sends the MP4 files and the MPD files to the client devices 300 under the control of the control unit 220. Meanwhile, the details of the communication performed by the communication unit 230 are not limited to the abovementioned details.

The memory unit 240 is a functional configuration for storing a variety of information. For example, the memory unit 240 is used to store the MP4 files and the MPD files received from the generation device 100; and is used to store the programs and the parameters to be used by the functional configurations of the delivery server 200. However, the information stored in the memory unit 240 is not limited to the abovementioned details.

(Functional Configuration of Client Device)

Figure 18:
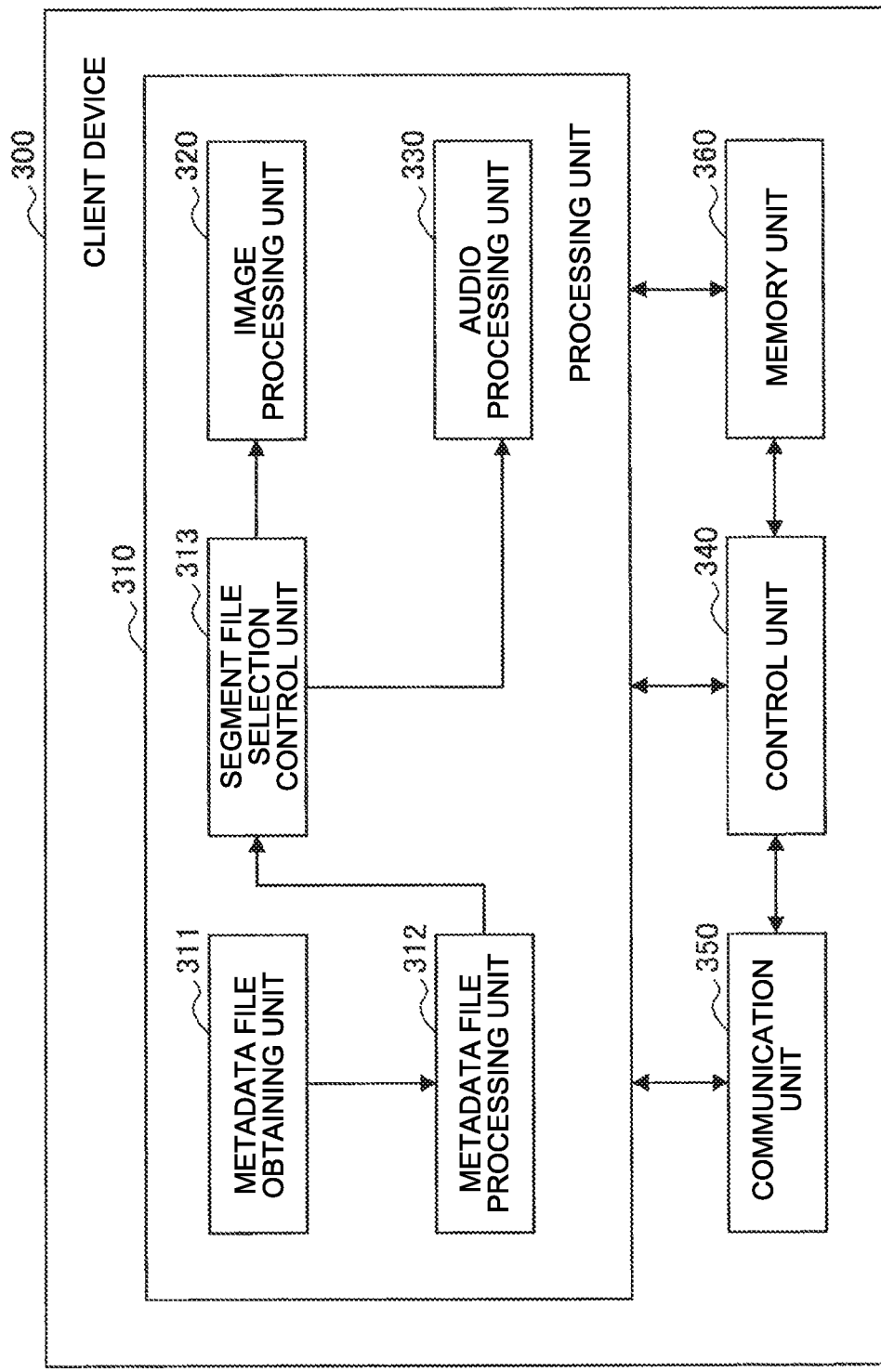
FIG. 18 is a block diagram illustrating an exemplary functional configuration of a client device 300 according to the first embodiment.

FIG. 18 is a block diagram illustrating an exemplary functional configuration of the client device 300 according to the first embodiment. As illustrated in FIG. 18, the client device 300 includes a processing unit 310, a control unit 340, a communication unit 350, and a memory unit 360.

The processing unit 310 is a functional configuration for performing operations related to content reproduction. The processing unit 310 can also perform, for example, the operations related to viewpoint switching as explained earlier with reference to FIG. 14. As illustrated in FIG. 18, the processing unit 310 includes a metadata file obtaining unit 311, a metadata file processing unit 312, a segment file selection control unit 313, an image processing unit 320, and an audio processing unit 330.

The metadata file obtaining unit 311 is a functional configuration that, before content reproduction is performed, obtains an MPD file (a metadata file) from the delivery server 200. More particularly, the metadata file obtaining unit 311 generates request information for an MPD file based on a user operation; sends the request information to the delivery server 200 via the communication unit 350; and obtains an MPD file from the delivery server 200. Then, the metadata file obtaining unit 311 sends the MPD file to the metadata file processing unit 312.

Meanwhile, as explained above, the metadata file that is obtained by the metadata file obtaining unit 311 according to the first embodiment includes the multi-view zoom switching information.

The metadata file processing unit 312 is a functional configuration that processes the MPD files provided by the metadata file obtaining unit 311. More particularly, based on the analysis of an MPD file, the metadata file processing unit 312 recognizes the information (for example, the URL) required in obtaining an MP4 file. Then, the metadata file processing unit 312 sends the information to the segment file selection control unit 313.

The segment file selection control unit 313 is a functional configuration that selects a segment file (an MP4 file) to be obtained. More particularly, based on the variety of information provided by the metadata file processing unit 312, the segment file selection control unit 313 selects a segment file to be obtained. For example, when the viewpoint is switched as a result of performing the viewpoint switching operation explained with reference to FIG. 14, the segment file selection control unit 313 according to the first embodiment can select the segment file of the switching destination viewpoint.

Figure 19:
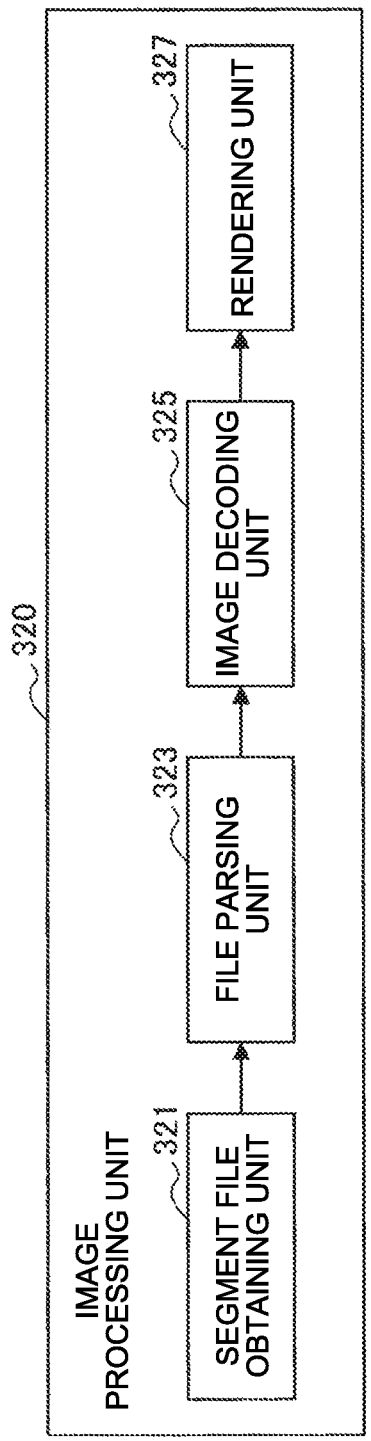
FIG. 19 is a diagram illustrating an exemplary functional configuration of an image processing unit 320.

The image processing unit 320 obtains the segment file based on the information selected by the segment file selection control unit 313, and performs image processing. FIG. 19 is a diagram illustrating an exemplary functional configuration of the image processing unit 320.

As illustrated in FIG. 19, the image processing unit 320 functions as a segment file obtaining unit 321, a file parsing unit 323, an image decoding unit 325, and a rendering unit 327. The segment file obtaining unit 321 generates request information based on the information selected by the segment file selection control unit 313; sends the request information to the delivery server 200; obtains the appropriate segment file (MP4 file) from the delivery server 200; and sends the segment file to the file parsing unit 323. Then, the file parsing unit 323 analyzes the obtained segment file; divides it into system layer metadata and an image stream; and sends the system layer metadata and the image stream to the image decoding unit 325. The image decoding unit 325 performs decoding with respect to the system layer metadata and the image stream, and sends pixel position metadata and decoded image signals to the rendering unit 327. The rendering unit 327 decides on the clipping range based on the information provided by the output device 400; performs image clipping; and generates a display image. The display image clipped by the rendering unit 327 is sent to the output device 400 via the communication unit 350, and is displayed in the output device 400.

Figure 20:
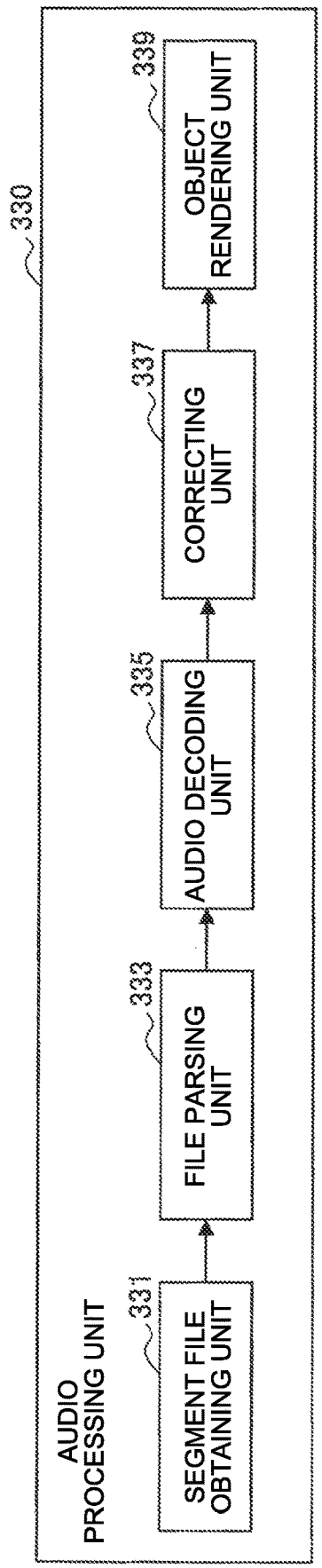
FIG. 20 is a diagram illustrating an exemplary functional configuration of an audio processing unit 330.

The audio processing unit 330 obtains the segment file based on the information selected by the segment file selection control unit 313, and performs audio processing. FIG. 20 is a diagram illustrating an exemplary functional configuration of the audio processing unit 330.

As illustrated in FIG. 20, the audio processing unit 330 functions as a segment file obtaining unit 331, a file parsing unit 333, an audio decoding unit 335, an object position correcting unit 337, and an object rendering unit 339. The segment file obtaining unit 331 generates request information based on the information selected by the segment file selection control unit 313; sends the request information to the delivery server 200; obtains the appropriate segment file (MP4 file) from the delivery server 200; and sends the segment file to the file parsing unit 333. Then, the file parsing unit 333 analyzes the obtained segment file; divides it into system layer metadata and an audio stream; and sends the system layer metadata and the audio stream to the audio decoding unit 335. The audio decoding unit 335 performs decoding with respect to the system layer metadata and the audio stream; and sends audio position metadata, which indicates the positions of the audio objects, and decoded audio signals to the object position correcting unit 337. Then, the object position correcting unit 337 corrects the positions of the audio objects based on the object position metadata and the multi-view zoom switching information, and sends the post-correction position information of the audio objects and the decoded audio signals to the object rendering unit 329. Then, the object rendering unit 339 performs rendering of a plurality of audio objects based on the post-correction position information of the audio objects and the decoded audio signals. The audio data synthesized by the object rendering unit 339 is then sent to the output device 400 via the communication unit 350, and is output as audio from the output device 400.

The control unit 340 is a functional configuration that comprehensively controls the overall operations performed by the client device 300. For example, the control unit 340 can control various operations based on the user input that is performed using an input unit (not illustrated) such as a mouse or a keyboard. Meanwhile, there is no particular restriction on the details of the control performed by the control unit 340. For example, the control unit 340 can also control the operations that are commonly performed in a general-purpose computer, a PC, or a tablet PC.

The communication unit 350 performs a variety of communication with the delivery server 200. For example, the communication unit 350 sends the request information, which is provided by the processing unit 310, to the delivery server 200. Moreover, the communication unit 350 functions as a receiving unit, and receives MPD files and MP4 files from the delivery server 200 in response to the request information. Meanwhile, the details of communication performed by the communication unit 350 are not limited to the abovementioned details.

The memory unit 360 is a functional configuration for storing a variety of information. For example, the memory unit 360 is used to store the MPD files and the MP4 files obtained from the delivery server 200; and is used to store the programs and the parameters to be used by the functional configurations of the client device 300. However, the information stored in the memory unit 360 is not limited to the abovementioned details.

<3-2. Storage of Multi-View Zoom Switching Information in Metadata File>

Till now, the explanation was given about an exemplary configuration according to the first embodiment. Given below is the explanation of the examples of storing the multi-view zoom switching information in a metadata file generated by the metadata file generating unit 114 according to the first embodiment.

Figure 21:
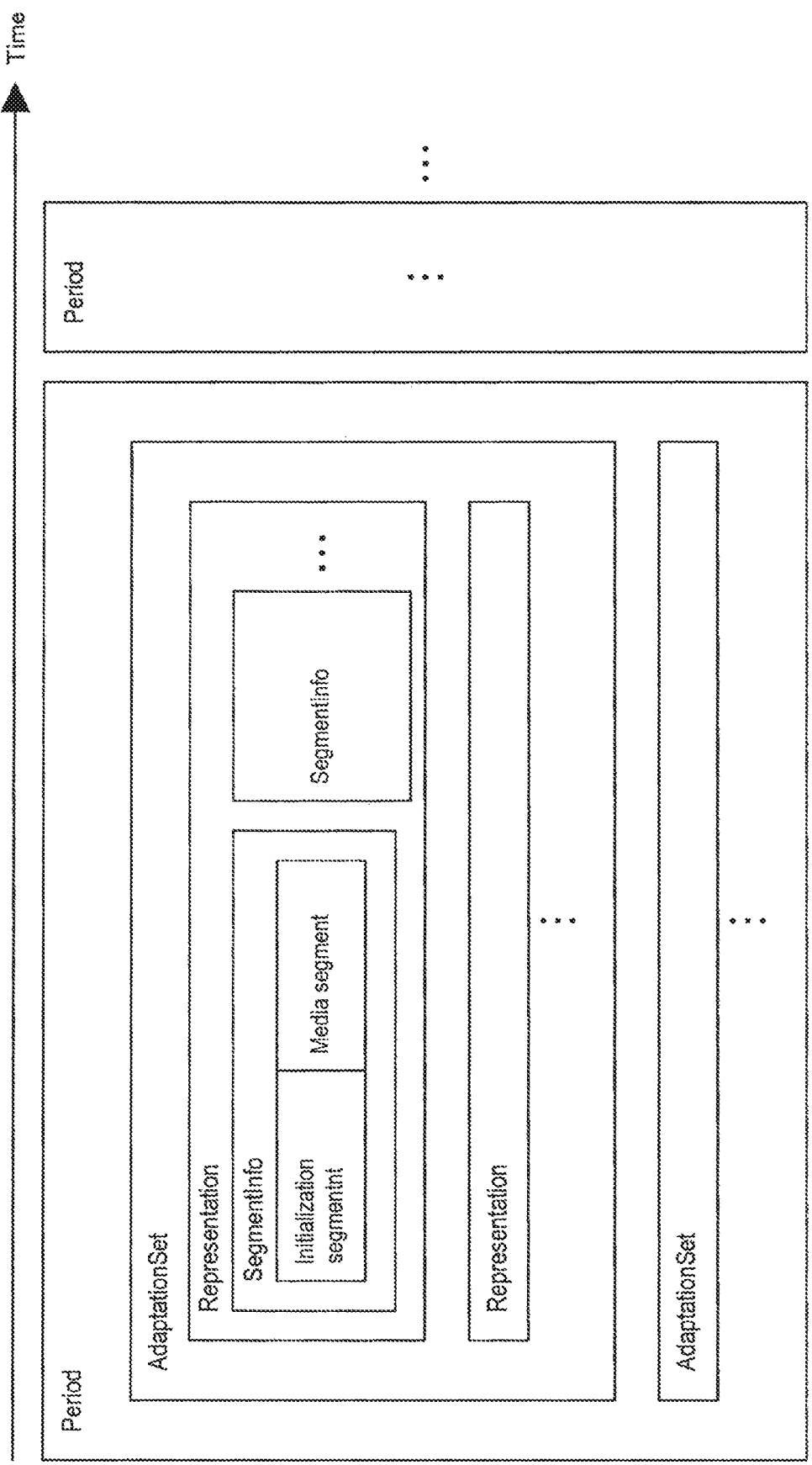
FIG. 21 is a diagram for explaining the layer structure of MPD files for which the standard definition is given in ISO/IEC 23009-1.

Firstly, the explanation is given about the layer structure of MPD files. FIG. 21 is a diagram for explaining the layer structure of MPD files for which the standard definition is given in ISO/IEC 23009-1. As illustrated in FIG. 21, an MPD file is configured with one or more "Period". In each "Period", meta-information of data such as synchronized images and audios is stored. For example, each "Period" is used to store a plurality of "AdaptationSet" meant for grouping the selection ranges ("Representation" groups) of streams.

In each "Representation", information such as the speed of encoding images and audios and the image size is stored. In each "Representation", a plurality of "SegmentInfo" is stored. Each "SegmentInfo" includes segment-related information after a stream has been divided into a plurality of files. Moreover, each "SegmentInfo" includes "Initialization segmentnt", which indicates the initialization information such as the data compression method; and "Media segment", which indicates the segments of images and audios.

Till now, the explanation was given about the layer configuration of an MPD file. The metadata file generating unit 114 according to the first embodiment can store the multi-view zoom switching information in an MPD file.

Working Example about Storage in "AdaptationSet"

As explained above, since the multi-view zoom switching information is available for each viewpoint, it is desirable that an MPD file is stored in a corresponding manner to each viewpoint. In multi-view content, each viewpoint can correspond to "AdaptationSet". In that regard, the metadata file generating unit 114 according to the first embodiment can store the multi-view zoom switching information in, for example, "AdaptationSet" explained above. With such a configuration, at the time of reproduction, the client device 300 becomes able to obtain the multi-view zoom switching information corresponding to the viewpoints.

FIG. 22 is a diagram illustrating an example of an MPD file generated by the metadata file generating unit 114 according to the first embodiment. In FIG. 22 is illustrated an example of an MPD file for multi-view content having three viewpoints. In the MPD file illustrated in FIG. 22, the elements and the attributes not related to the features of the first embodiment are omitted.

As illustrated in the fourth line, the eighth line, and the 12-th line in FIG. 22, "EssentialProperty" that is defined as an extension property of "AdaptationSet" is stored as the multi-view zoom switching information in the corresponding "AdaptationSet". Meanwhile, instead of using "EssentialProperty", it is possible to use "SupplementalProperty". In that case, the same description can be written by substituting "SupplementalProperty" for "EssentialProperty".

Moreover, as illustrated in the fourth line, the eighth line, and the 12-th line in FIG. 22, "schemeldUri" of "EssentialProperty" is set as the name indicating the multi-view zoom switching information, and the values of that multi-view zoom switching information are enumerated in "value" of the concerned "EssentialProperty". In the example illustrated in FIG. 2, "urn:mpeg:dash:multi-view_zoom_switch_parameters:2018" represents "schemeldUri". Moreover, "value" indicates the abovementioned multi-view zoom switching information in the form of "(image type information), (photographing related information), (angle-of-view for content reproduction), (number of sets of switching destination viewpoint information), (switching destination viewpoint 1), (switching destination viewpoint 2), . . . ". Meanwhile, the character string illustrated in "schemeldUri" in FIG. 22 is only exemplary, and is not limited to that example.

The MPD files generated by the metadata file generating unit 114 according to the first embodiment are not limited to the example illustrated in FIG. 22. Alternatively, for example, the metadata file generating unit 114 according to the first embodiment can store the multi-view zoom switching information in the "Period" mentioned earlier. In that case, in order to associate the sets of multi-view zoom switching information to the viewpoints, each multi-view zoom switching information can be stored in the concerned "Period" in a corresponding manner to one "AdaptationSet" included in the concerned "Period". With such a configuration, at the time of reproduction, the client device 300 becomes able to obtain the multi-view zoom switching information corresponding to the viewpoints.

Working Example about Storage in "Period" in Corresponding Manner to "AdaptationSet"

FIG. 23 is a diagram illustrating another example of an MPD file generated by the metadata file generating unit 114 according to the first embodiment. In FIG. 23 is illustrated an example of an MPD file for multi-view content having three viewpoints in an identical manner to FIG. 22. In the MPD file illustrated in FIG. 23, the elements and the attributes not related to the features of the first embodiment are omitted.

As illustrated in the third to fifth lines, "EssentialProperty" that is defined as an extension property of the concerned "Period" is collectively stored, as the multi-view zoom switching information, equal in number to the number of "AdaptationSet" in that "Period". Meanwhile, instead of using "EssentialProperty", it is possible to use "SupplementalProperty". In that case, the same description can be written by substituting "SupplementalProperty" for "EssentialProperty".

With reference to FIG. 23, "schemeIdUri" of "EssentialProperty" is identical to "schemeIdUri" explained with reference to FIG. 22. Hence, that explanation is not given again. In the example illustrated in FIG. 23, "value" of each "EssentialProperty" includes the multi-view zoom switching information in an identical manner to "value" explained with reference to FIG. 22. However, in addition to "value" explained with reference to FIG. 22, "value" illustrated in FIG. 23 includes the value of "AdaptationSet_id" at the front, and is associated to the corresponding "Adaptation-Set".

For example, in FIG. 23, the multi-view zoom switching information in the third line is associated to "AdaptationSet" in the sixth to eighth lines; the multi-view zoom switching information in the fourth line is associated to "Adaptation-Set" written in the ninth line to the 11-th line; and the multi-view zoom switching information in the fifth line is associated to "AdaptationSet" written in the 12-th to 14-th lines.

Modification Example

Till now, the explanation was given about the examples of storing the multi-view zoom switching information in an MPD file by the metadata file generating unit 114 according to the first embodiment. However, the first embodiment is not limited to those examples.

For example, as a modification example, the metadata file generating unit 114 can generate, in addition to generating an MPD file, other metadata files different than the MPD file; and can store the multi-view zoom switching information in the other metadata files. Then, the metadata file generating unit 114 can store, in the MPD file, access information to be used in accessing the metadata files in which the multi-view zoom switching information is stored. In this modification example, explained below with reference FIG. 24 is an MPD file generated by the metadata file generating unit 114.

FIG. 24 is a diagram illustrating an example of an MPD file generated by the metadata file generating unit 114 according to the modification example. In FIG. 24 is illustrated an example of an MPD file for multi-view content having three viewpoints in an identical manner to FIG. 22. In the MPD file illustrated in FIG. 24, the elements and the attributes not related to the features of the first embodiment are omitted.

As illustrated in the fourth line, the eighth line, and the 12-th line in FIG. 24, "EssentialProperty" that is defined as an extension property of "AdaptationSet" is stored as the access information in the corresponding "AdaptationSet". Meanwhile, instead of using "EssentialProperty", it is possible to use "SupplementalProperty". In that case, the same description can be written by substituting "Supplemental-Property" for "EssentialProperty".

With reference to FIG. 24, "schemeIdUri" of "Essential-Property" is identical to "schemeIdUri" explained with reference to FIG. 22. Hence, that explanation is not given again. In the example illustrated in FIG. 24, "value" of each "EssentialProperty" includes the access information to be used in accessing the metadata file in which the corresponding multi-view zoom switching information is stored.

For example, "POS-100.txt" specified in "value" in the fourth line in FIG. 24 can be a metadata file including a set of multi-view zoom switching information and having the following contents.

2D, 60, 40, (0, 0, 0), (10, 20, 30), 90, 60, 2, (0, 540, 960, 540), 3, 2, (960, 0, 960, 540), 2, 3

Moreover, "POS-200.txt" specified in "value" in the eighth line in FIG. 24 can be a metadata file including a set of multi-view zoom switching information and having the following contents.

2D, 60, 40, (10, 10, 0), (10, 20, 30), 90, 60, 1, (0, 540, 960, 540), 4, 4

Furthermore, "POS-300.txt" specified in "value" in the 12-th line in FIG. 24 can be a metadata file including a set of multi-view zoom switching information and having the following contents.

2D, 60, 40, (−10, 20, 0), (20, 30, 40), 45, 30, 1, (960, 0, 960, 540), 2, 5

Meanwhile, with reference to FIG. 24, although the explanation is given for an example in which the access information is stored in each "AdaptationSet, alternatively the access information can be stored in "Period" in a corresponding manner to each "AdaptationSet".

3-3. Operation Example

Till now, the explanation was given about the metadata files generated by the metadata file generating unit 114 according to the first embodiment. Given below is the explanation of an operation example according to the first embodiment.

Figure 25:
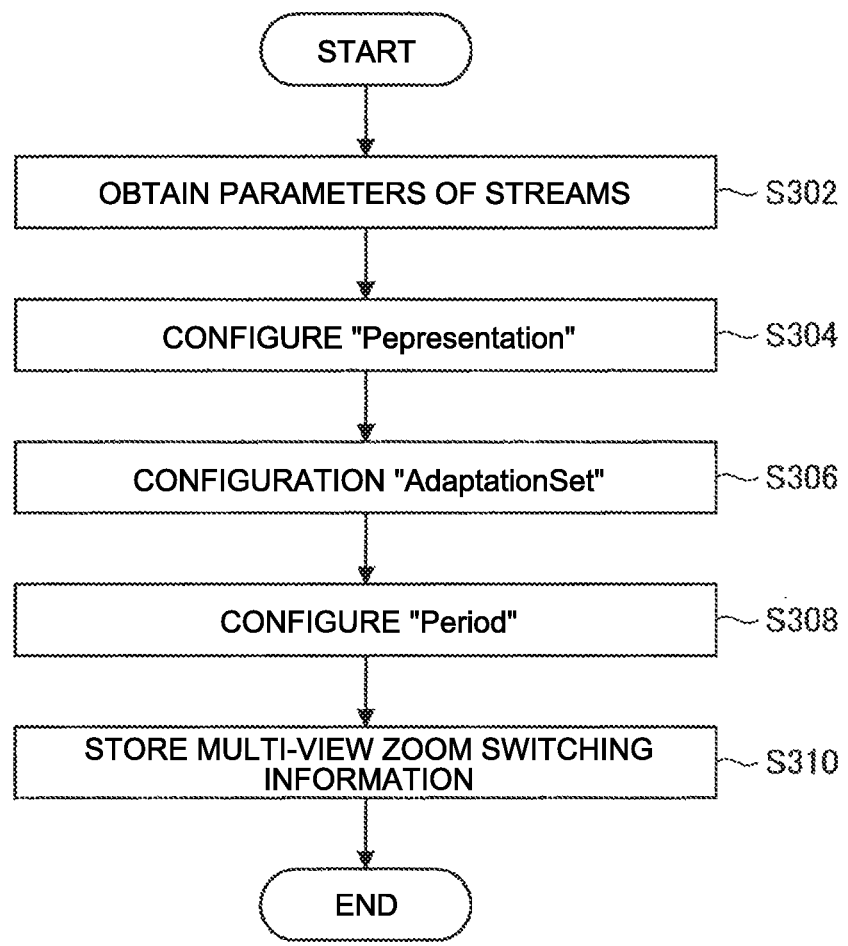
FIG. 25 is a flowchart for explaining an example of the operations performed by the generation device 100 according to the first embodiment.

FIG. 25 is a flowchart for explaining an example of the operations performed by the generation device 100 according to the first embodiment. With reference to FIG. 25, the explanation is given mainly about the operations related to the generation of a metadata file by the metadata file generating unit 114 of the generation device 100. Of course, the generation device 100 can also perform operations not illustrated in FIG. 25.

As illustrated in FIG. 25, firstly, the metadata file generating unit 114 obtains parameters of an image stream and an audio stream (S302). Then, the metadata file generating unit 114 configures "Pepresentation" based on the image stream and the audio stream (S304). Then, the metadata file generating unit 114 configures "Period" (S308). Subsequently, the metadata file generating unit 114 stores the multi-view zoom switching information as explained earlier, and generates an MPD file (S310).

Meanwhile, before the operations illustrated in FIG. 25 are performed or at least before the operation at Step S310 is performed, the operations related to the generation of the multi-view zoom switching information as explained with reference to FIG. 13 can be performed, so that the multi-view zoom switching information is already generated.

Figure 26:
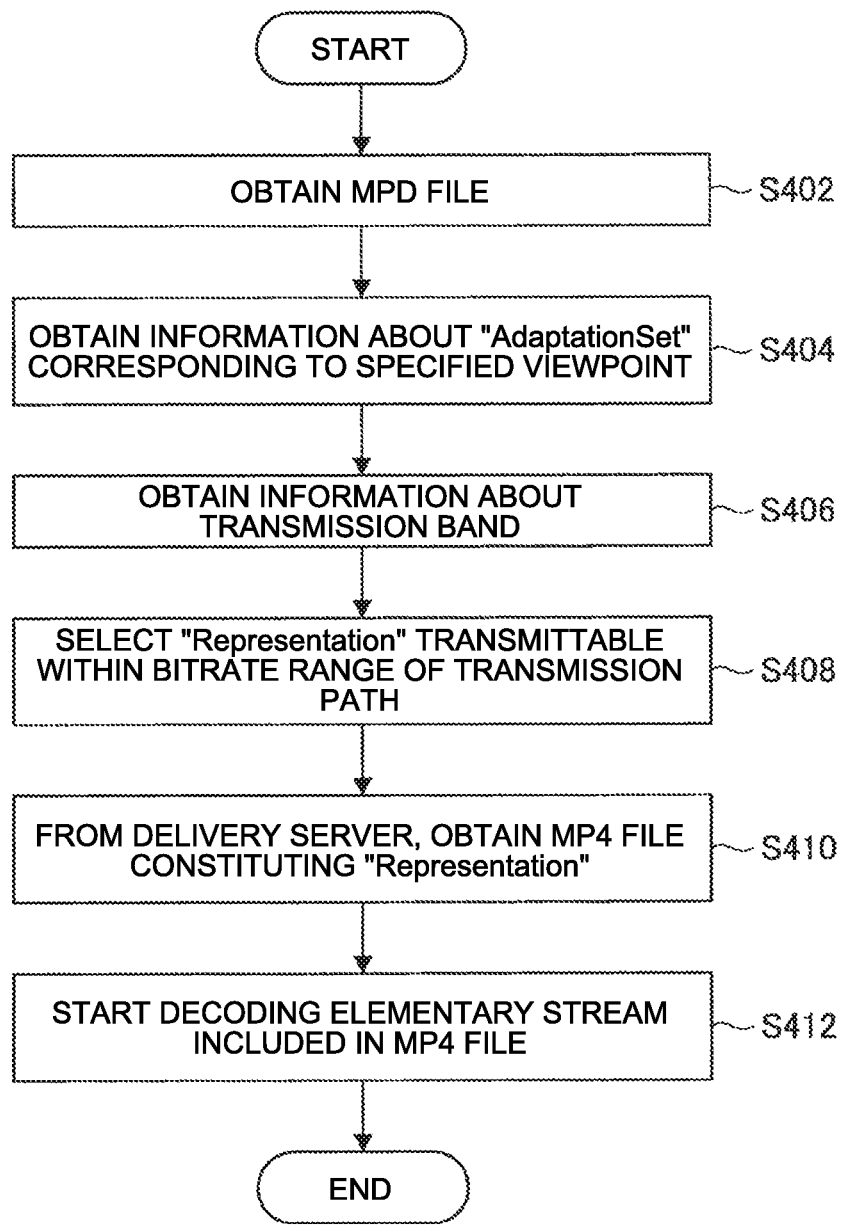
FIG. 26 is a flowchart for explaining an example of the operations performed in the client device 300 according to the first embodiment.

FIG. 26 is a flowchart for explaining an example of the operations performed in the client device 300 according to the first embodiment. Of course, the client device 300 can also perform operations not illustrated in FIG. 26.

As illustrated in FIG. 26, firstly, the processing unit 310 obtains an MPD file (S402). Then, the processing unit 310 obtains the information about "AdaptationSet" corresponding to the specified viewpoint (S404). The specified viewpoint can be, for example, the viewpoint mentioned in the initial setting, or can be a viewpoint selected by the user, or can be the switching destination viewpoint identified as a result of performing the viewpoint switching operation explained with reference to FIG. 14.

Subsequently, the processing unit 310 obtains information about the transmission band (S406) and selects the "Representation" that is transmittable within the bitrate range of the transmission path (S408). Moreover, the processing unit 310 obtains, from the delivery server 200, the MP4 file constituting the "Representation" selected at Step S408 (S410). Then, the processing unit 310 starts decoding the elementary stream included in the MP4 file obtained at Step S410 (S412).

4. Second Embodiment

Till now, the explanation was given about the first embodiment of the application concerned. In the first embodiment described above, the explanation was given about an example of performing streaming delivery using MPEG-DASH. As a second embodiment, the following explanation is given about an example in which, instead of performing streaming delivery, a content file is provided via a memory device. In the second embodiment, the multi-view zoom switching information is stored in a content file.

4-1. Configuration Example (Exemplary Functional Configuration of Generation Device)

Figure 27:
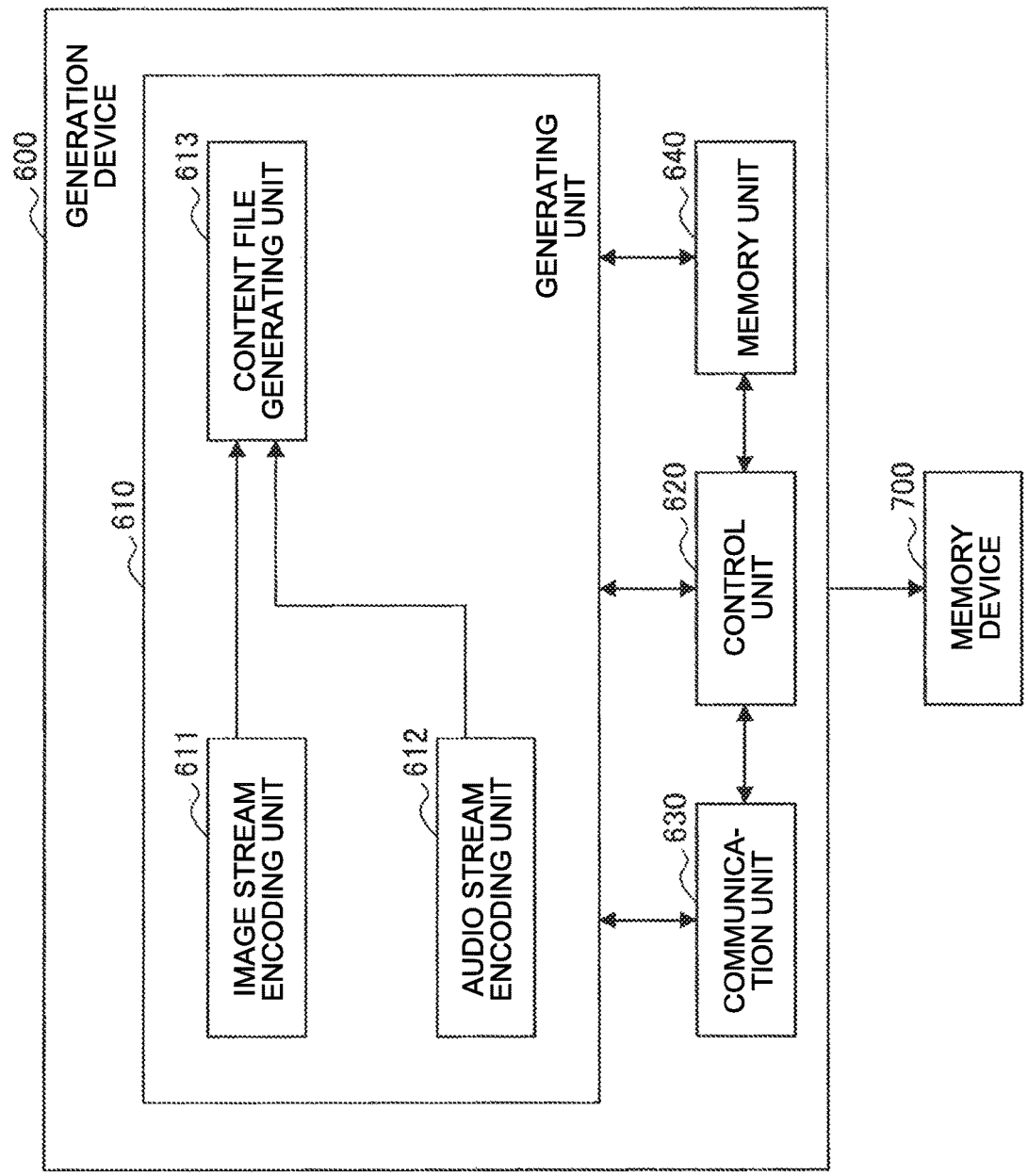
FIG. 27 is a block diagram illustrating an exemplary functional configuration of a generation device 600 according to a second embodiment of the application concerned.

FIG. 27 is a block diagram illustrating an exemplary functional configuration of a generation device 600 according to the second embodiment of the application concerned. The generation device 600 according to the application concerned is an information processing device that generates content files. Moreover, the generation device 600 is connectible to a memory device 700. The memory device 700 is used to store the content files generated by the generation device 600. The memory device 700 can be, for example, a portable storage.

As illustrated in FIG. 27, the generation device 600 according to the second embodiment includes a generating unit 610, a control unit 620, a communication unit 630, and a memory unit 640.

The generating unit 610 performs operations related to images and audios, and generates content files. As illustrated in FIG. 27, the generating unit 610 functions as an image stream encoding unit 611, an audio stream encoding unit 612, and a content file generating unit 613. Herein, the image stream encoding unit 611 and the audio stream encoding unit 612 can have identical functions to the image stream encoding unit 111 and the audio stream encoding unit 112, respectively, explained earlier with reference to FIG. 16.

The content file generating unit 613 generates a content file based on the information provided by the image stream encoding unit 611 and the audio stream encoding unit 612. A content file generated by the content file generating unit 613 according to the second embodiment can be an MP4 file (an ISOBMFF file) in an identical manner to the first embodiment.

In the second embodiment, the content file generating unit 613 stores the multi-view zoom switching information in the header of a content file. Moreover, in the second embodiment, the content file generating unit 613 can store, in the header, the multi-view zoom switching information in a corresponding manner to each viewpoint of a plurality of viewpoints among which the multi-view zoom switching information can be switched (i.e. the viewpoints of multi-view content). Regarding the examples of storing the multi-view zoom switching information in the header of a content file, the explanation is given later.

An MP4 file generated by the content file generating unit 613 is output to and stored in the memory device 700 illustrated in FIG. 27.

The control unit 620 is a functional configuration that comprehensively controls the overall operations performed in the generation device 600. Meanwhile, there is no particular restriction on the details of the control performed by the control unit 620. For example, the control unit 620 can also control the operations that are commonly performed in a general-purpose computer, a PC, or a tablet PC.

The communication unit 630 performs a variety of communication. For example, the communication unit 630 sends the MP4 files, which are generated by the generating unit 110, to the memory device 700. However, the details of communication performed by the communication unit 630 are not limited to the abovementioned details.

The memory unit 640 is a functional configuration for storing a variety of information. For example, the memory unit 640 is used to store the multi-view zoom switching information, the multi-view image signals, the audio object signals, and the MP4 files; and is used to store the programs and the parameters to be used by the functional configurations of the generation device 600. However, the information stored in the memory unit 640 is not limited to the abovementioned details.

(Exemplary Functional Configuration of Reproduction Device)

Figure 28:
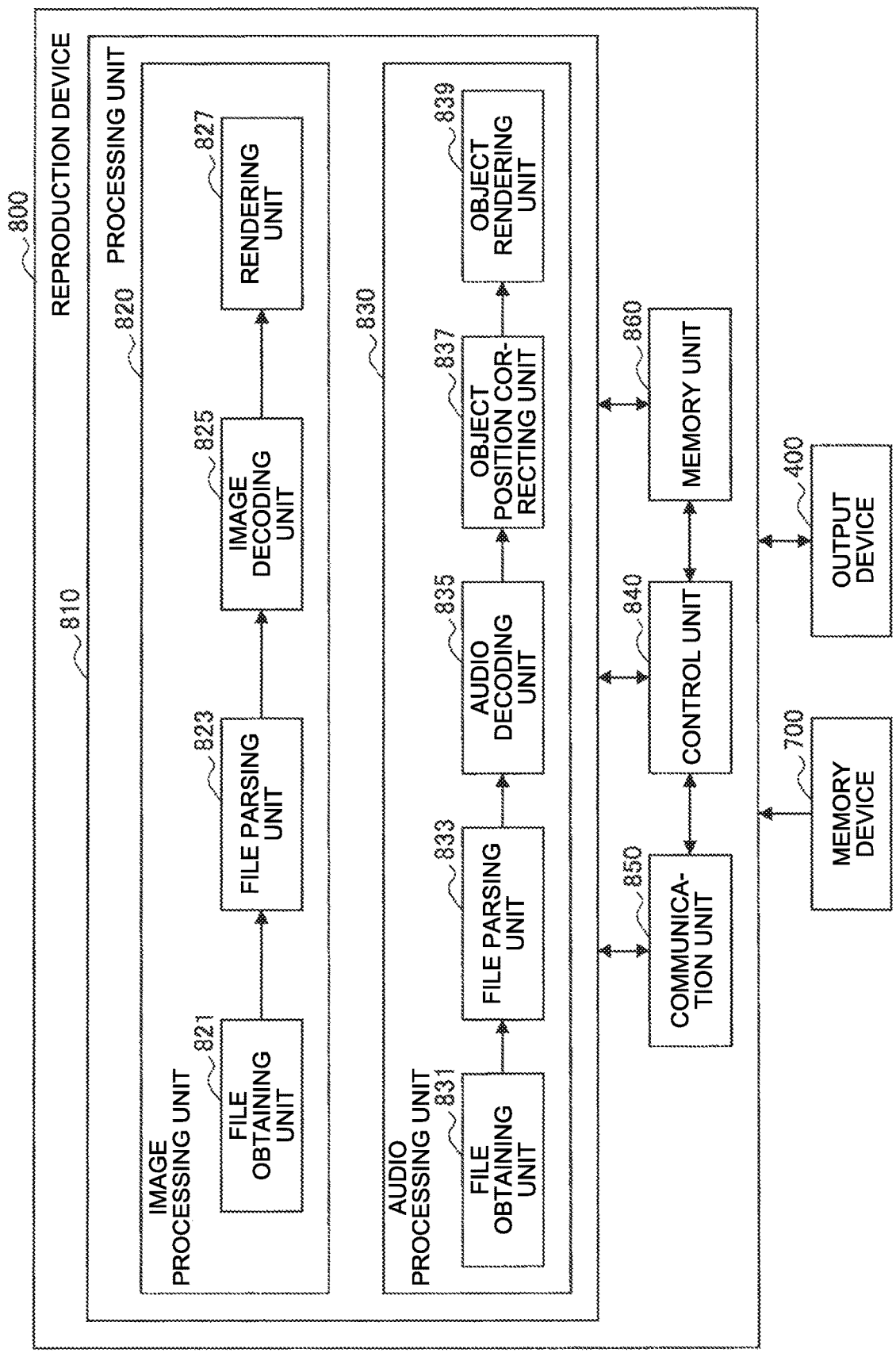
FIG. 28 is a block diagram illustrating an exemplary functional configuration of a reproduction device 800 according to the second embodiment of the application concerned.

FIG. 28 is a block diagram illustrating an exemplary functional configuration of a reproduction device 800 according to the second embodiment of the application concerned. The reproduction device 800 according to the second embodiment is an information processing device connected to the memory device 700; and obtains the MP4 files from the memory device 700 and reproduces them. The reproduction device 800 is also connected to the output device 400, and displays the display images in the output device 400 and outputs audios to the output device 400. In an identical manner to the client device 300 illustrated in FIG. 15, the reproduction device 800 can be connected to the output device 400 of the mounted-type or to the output device 400 wearable by a user, or can be configured in an integrated manner with the output device 400.

As illustrated in FIG. 28, the reproduction device 800 according to the second embodiment includes a processing unit 810, a control unit 840, a communication unit 850, and a memory unit 860.

The processing unit 810 is a functional configuration that performs operations related to content reproduction. The processing unit 810 can perform operations regarding, for example, the viewpoint switching explained earlier with reference to FIG. 14. As illustrated in FIG. 28, the processing unit 810 functions as an image processing unit 820 and an audio processing unit 830.

The image processing unit 820 obtains an MP4 file stored in the memory device 700, and performs image processing. As illustrated in FIG. 28, the image processing unit 820 functions as a file obtaining unit 821, a file parsing unit 823, an image decoding unit 825, and a rendering unit 827. The file obtaining unit 821 functions as a content file obtaining unit that obtains an MP4 file from the memory device 700 and sends it to the file parsing unit 823. As explained earlier, an MP4 file obtained by the file obtaining unit 821 includes the multi-view zoom switching information, which is stored in the header. The file parsing unit 823 analyzes the obtained MP4 file; divides it into system layer metadata (the header) and an image stream; and sends the system layer metadata (the header) and the image stream to the image decoding unit 825. Meanwhile, the functions of the image decoding unit 825 and the rendering unit 827 are identical to the functions of the image decoding unit 325 and the rendering unit 327, respectively, explained earlier with reference to FIG. 19. Hence, that explanation is not given again.

The audio processing unit 830 obtains an MP4 file stored in the memory device 700, and performs audio processing. As illustrated in FIG. 28, the audio processing unit 830 functions as a file obtaining unit 831, an audio decoding unit 835, an object position correcting unit 837, and an object rendering unit 839. The file obtaining unit 831 functions as a content file obtaining unit that obtains an MP4 file from the memory device 700 and sends it to a file parsing unit 833. As explained earlier, an MP4 file obtained by the file obtaining unit 831 includes the multi-view zoom switching information, which is stored in the header. The file parsing unit 833 analyzes the obtained MP4 file; divides it into system layer metadata (the header) and an audio stream; and sends the system layer metadata (the header) and the audio stream to the audio decoding unit 835. Meanwhile, the functions of the audio decoding unit 835, the object position correcting unit 837, and the object rendering unit 839 are identical to the functions of the audio decoding unit 335, the object position correcting unit 337, and the object rendering unit 339, respectively, explained earlier with reference to FIG. 20. Hence, that explanation is not given again.

The control unit 840 is a functional configuration that comprehensively controls the overall operations performed by the reproduction device 800. For example, the control unit 840 can control various operations based on the user input that is performed using an input unit (not illustrated) such as a mouse or a keyboard. Meanwhile, there is no particular restriction on the details of the control performed by the control unit 840. For example, the control unit 340 can also control the operations that are commonly performed in a general-purpose computer, a PC, or a tablet PC.

The communication unit 850 performs a variety of communication. Moreover, the communication unit 850 also functions as a receiving unit and receives MP4 files from the memory device 700. Meanwhile, the details of communication performed by the communication unit 850 are not limited to the abovementioned details.

The memory unit 860 is a functional configuration for storing a variety of information. For example, the memory unit 860 is used to store the MP4 files obtained from the memory device 700; and is used to store the programs and the parameters to be used by the functional configurations of the reproduction device 800. However, the information stored in the memory unit 860 is not limited to the abovementioned details.

Till now, the explanation was given about the generation device 600 and the reproduction device 800 according to the second embodiment. Although the explanation above was given about an example in which the MP4 files are provided via the memory device 700, it is not the only possible case. Alternatively, the generation device 600 and the reproduction device 800 either can be connected to each other via a communication network or can be directly connected to each other; and the MP4 files can be sent from the generation device 600 to the reproduction device 800 and can be stored in the memory unit 860 of the reproduction device 800.

4-2. Examples of Storage of Multi-View Zoom Switching Information in Content File Till now, the explanation was given about a configuration example of the second embodiment. Given below is the explanation about the examples of storing the multi-view zoom switching information in the header of a content file generated by the content file generating unit 613.

As described above, in the second embodiment, the content file generated by the content file generating unit 613 can be an MP4 file. When an MP4 file is an ISOBMFF file for which the standard definition is given in ISO/IEC 14496-12, a "moov" box (system layer metadata) is included in the MP4 file as the header thereof.

Working Example about Storage in "udta" Box

Figure 29:
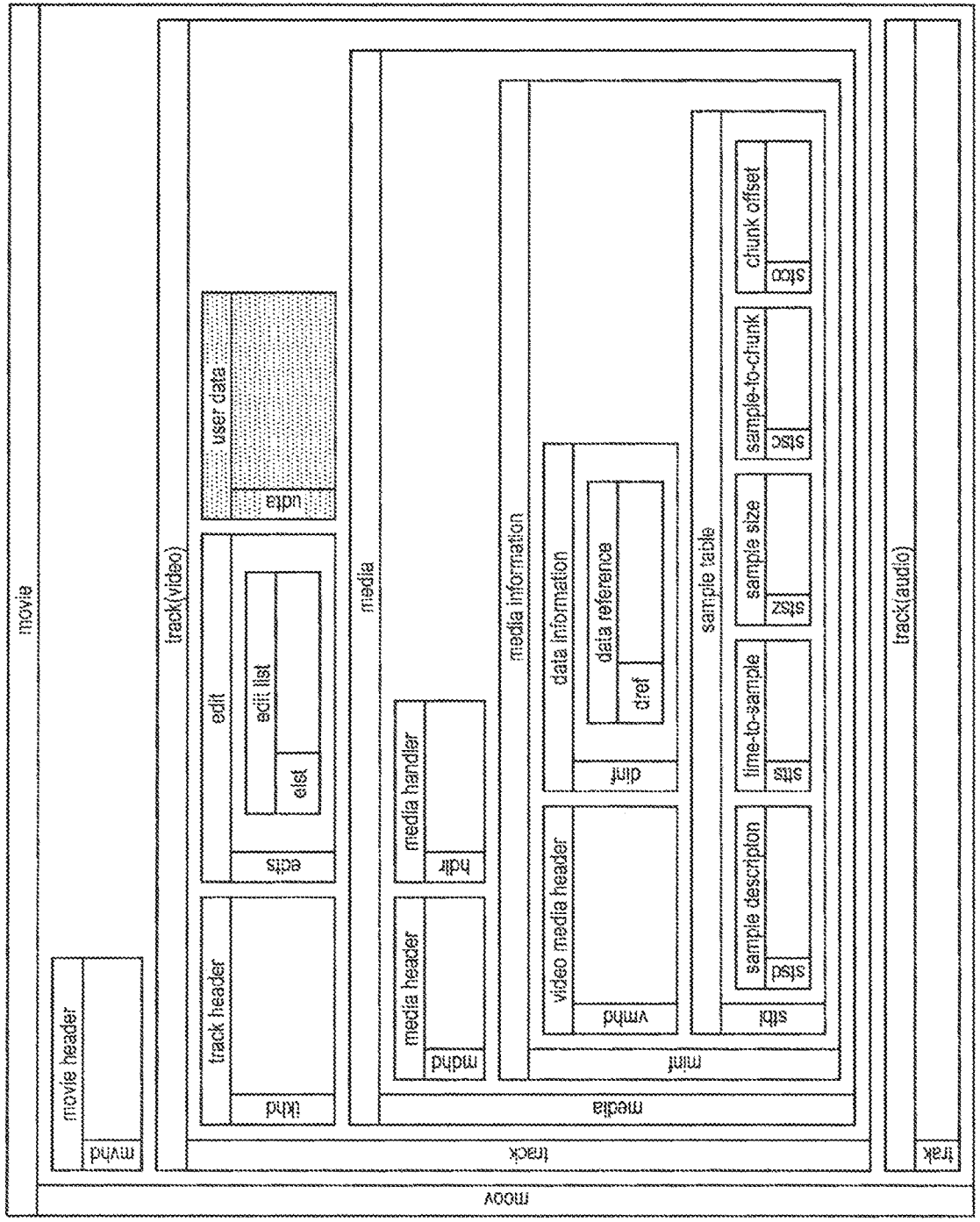
FIG. 29 is a diagram illustrating a box structure of "moov" box in an ISOBMFF file.

FIG. 29 is a diagram illustrating a box structure of the "moov" box in an ISOBMFF file. The content file generating unit 613 according to the second embodiment can store the multi-view zoom switching information in, for example, "udta" box of the "moon" box illustrated in FIG. 29. The "udta" box enables storage of arbitrary user data and, as illustrated in FIG. 29, is included in "track" box and represents static metadata for video tracks. Meanwhile, the area in which the multi-view zoom switching information is stored is not limited to the "udta" box in the hierarchical positions illustrated in FIG. 29. For example, the existing box version can be modified to provide an extension area inside the box (the extension area too is defined as, for example, a single box), and the multi-view zoom switching information can be stored in that extension area.

FIG. 30 is a diagram illustrating an example of the "udta" box in the case in which the multi-view zoom switching information is stored in the "udta" box. In FIG. 30, "video_type" written in the seventh line corresponds to the image type information illustrated in FIG. 9. Moreover, in FIG. 30, the parameters written from the eighth line to the 15-th line correspond to the photographing related information illustrated in FIG. 9. Moreover, in FIG. 30, the parameters written in the 16-th and 17-th lines correspond to the angle-of-view information for content reproduction as illustrated in FIG. 9. Furthermore, in FIG. 30, "number_of_destination_views" written in the 18-th line corresponds to the number of sets of switching destination viewpoint information illustrated in FIG. 9. Moreover, in FIG. 30, the parameters written in the 20-th to 25-th lines correspond to the switching destination viewpoint information illustrated in FIG. 9, and are stored in a corresponding manner to the viewpoints.

Working Example about Storage as "Metadata Track"

Till now, the explanation was given about an example in which the multi-video zoom switching information is stored as static metadata for video tracks in the "udta" box. However, the second embodiment is not limited to that case. For example, in the case in which the multi-view zoom switching information changes according to the reproduction timing, it is difficult to store the multi-view zoom switching information in the "udta" box.

In that regard, in the case in which the multi-view zoom switching information changes according to the reproduction timing, "track" representing a structure having the temporal axis can be used, and "metadata track" indicating the multi-view zoom switching information can be newly defined. The method for defining the "metadata track" in ISOBMFF is written in ISO/IEC 14496-12, and the "metadata track" according to this working example can be defined to be compliant to ISO/IEC 14496-12. Regarding this working example, the explanation is given below with reference to FIGS. 31 and 32.

In this working example, the content file generating unit 613 stores the multi-view zoom switching information as "timed metadata track" in "mdat" box. Meanwhile, in this working example, the content file generating unit 613 can store the multi-view zoom switching information in the "moon" box too.

Figure 31:
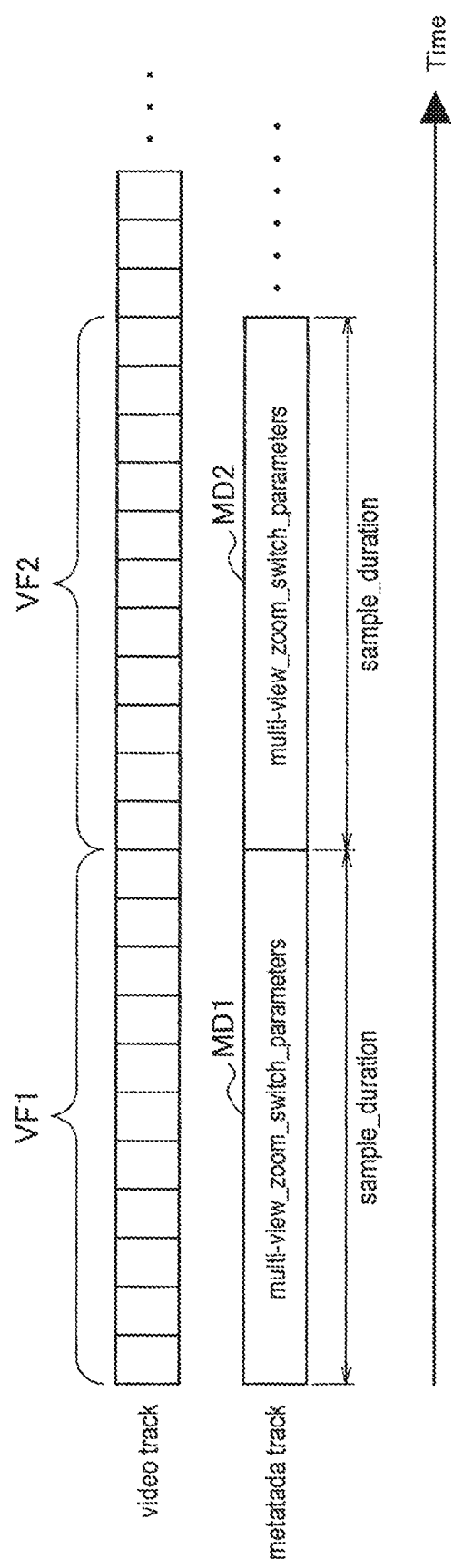
FIG. 31 is an explanatory diagram for explaining about "metadata track".

FIG. 31 is an explanatory diagram for explaining about the "metadata track". In the example illustrated in FIG. 31, the temporal range in which there is no change in the multi-view zoom switching information is defined as a single "sample", and a single "sample" is associated to a single set of "multi-view_zoom_switch_parameters" (the multi-view zoom switching information). Moreover, the valid duration of a single set of "multi-view_zoom_ switch_parameters" can be expressed using "sample duration". Regarding the other information about the "sample", such as the size of the "sample"; the information of "stbl" box illustrated in FIG. 29 can be used without modification.

For example, in the example illustrated in FIG. 31, as the multi-video zoom switching information applied in the video frames of a range VF1, a set of "multi-view_zoom_switch_parameters MD1" is stored in the "mdat" box. Moreover, in the example illustrated in FIG. 32, as the multi-video zoom switching information applied in the video frames of a range VF2, a set of "multi-view_zoom_switch_parameters MD2" is stored in the "mdat" box.

Moreover, in this working example, the content file generating unit 613 can store the multi-view zoom switching information in the "moov" box too. FIG. 32 is a diagram for explaining the multi-view zoom switching information that is stored in the "moov" box by the content file generating unit 613 according to this working example.

In this working example, the content file generating unit 613 can define "sample" as illustrated in FIG. 32, and can store it in the "moov" box. Meanwhile, in FIG. 32, the parameters are identical to the parameters indicating the multi-view zoom switching information explained earlier with reference to FIG. 30.

4-3. Operation Example

Till now, the explanation was given about a content file generated by the content file generating unit 613 according to the second embodiment. Given below is the explanation of an operation example according to the second embodiment.

Figure 33:
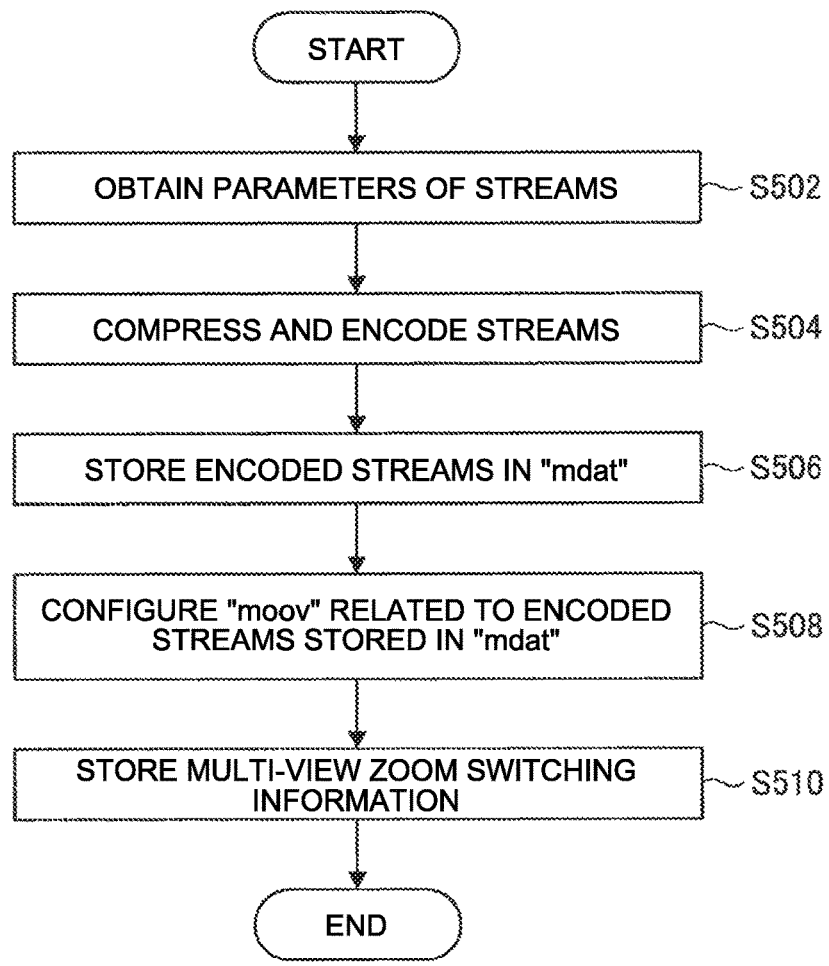
FIG. 33 is a flowchart for explaining an example of the operations performed in the generation device 600 according to the second embodiment.

FIG. 33 is a flowchart for explaining an example of the operations performed in the generation device 600 according to the second embodiment. In FIG. 33, the explanation is given about the operations mainly related to the generation of an MP4 file by the generating unit 610 of the generation device 600. Of course, the generation device 600 can perform operations not illustrated in FIG. 33.

As illustrated in FIG. 33, firstly, the generating unit 610 obtains the parameters of an image stream and an audio stream (S502). Then, the generating unit 610 compresses and encodes the image stream and the audio stream (S504). Subsequently, the content file generating unit 613 stores the encoded streams, which are obtained at Step S504, in the "mdat" box (S506). Then, the content file generating unit 613 configures the "moov" box related to the encoded streams stored in the "mdat" box (S508). Subsequently, the content file generating unit 613 stores the multi-view zoom switching information in the "moov" box or the "mdat" box as explained above, and generates an MP4 file (S510).

Meanwhile, either before the operations illustrated in FIG. 33 are performed or at least before the operation at Step S510 is performed, the operations related to the generation of the multi-view zoom switching information as explained earlier with reference to FIG. 13 can be performed, so that the multi-view zoom switching information is already generated.

Figure 34:
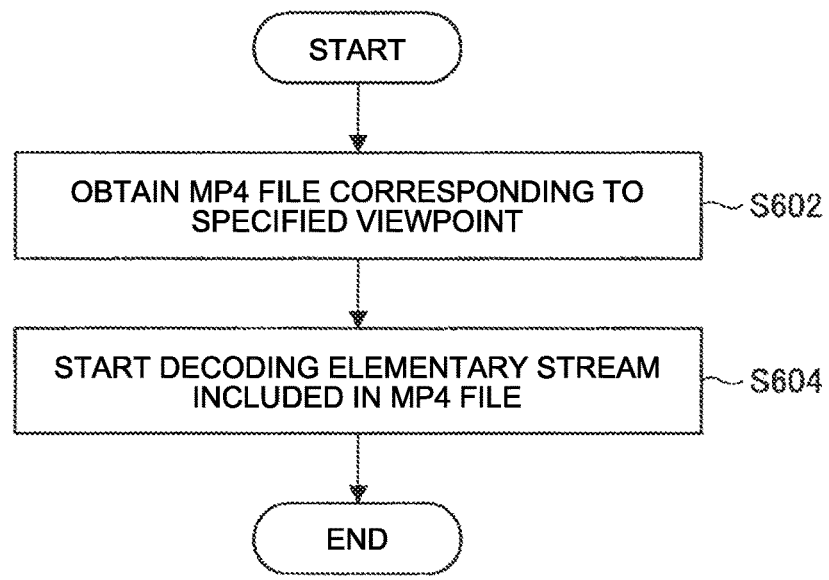
FIG. 34 is a flowchart for explaining an example of the operations performed in the reproduction device 800 according to the second embodiment.

FIG. 34 is a flowchart for explaining an example of the operations performed in the reproduction device 800 according to the second embodiment. Of course, the reproduction device 800 can also perform operations not illustrated in FIG. 34.

As illustrated in FIG. 34, firstly, the processing unit 810 obtains an MP4 file corresponding to the specified viewpoint (S602). The specified viewpoint can be, for example, the viewpoint mentioned in the initial setting, or can be a viewpoint selected by the user, or can be the switching destination viewpoint identified as a result of performing the viewpoint switching operation explained earlier with reference to FIG. 14.

Then, the processing unit 810 starts decoding the elementary stream included in the MP4 file obtained at Step S602.

5. Exemplary Hardware Configuration

Figure 35:
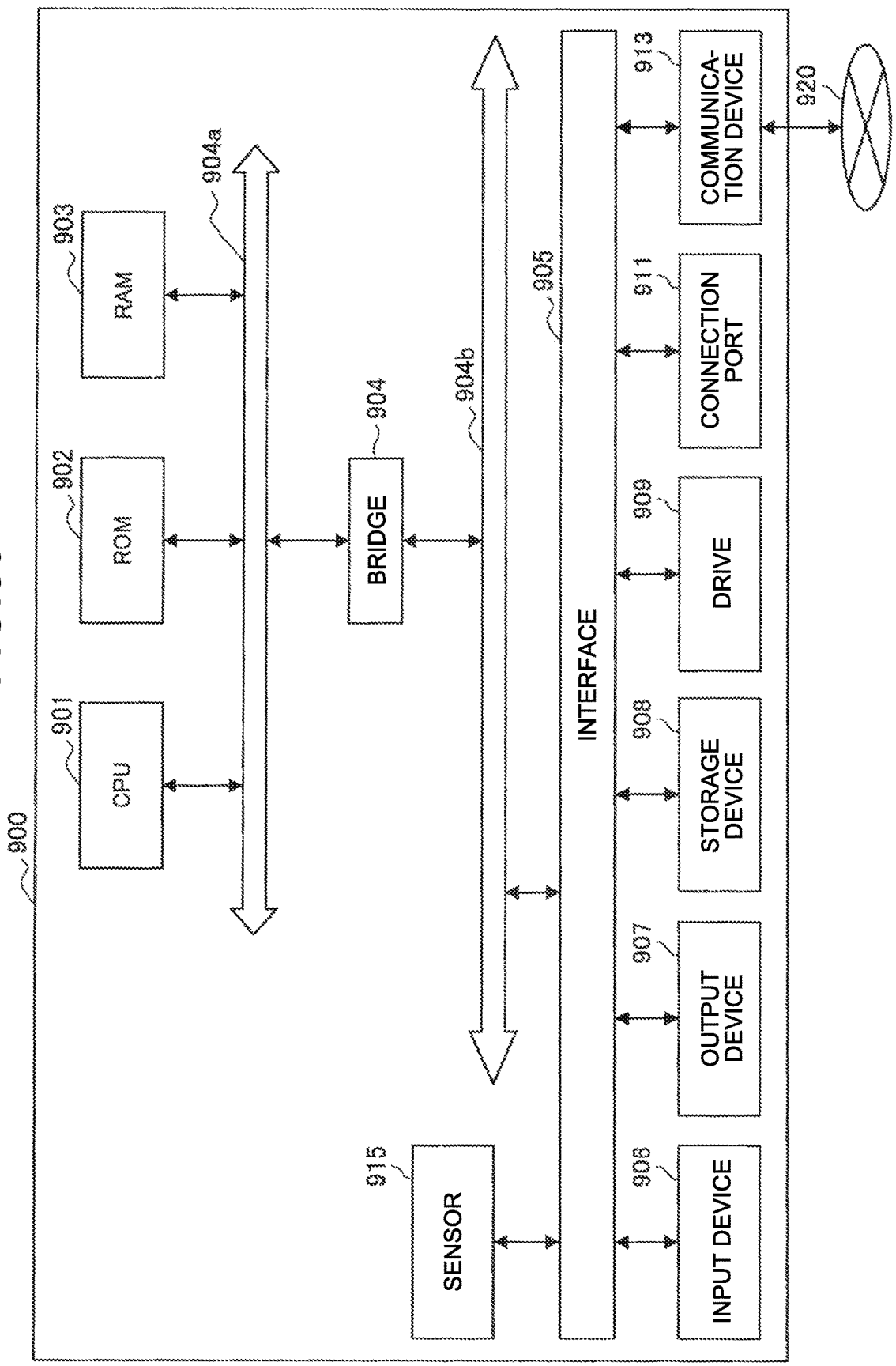
FIG. 35 is a block diagram illustrating an exemplary hardware configuration.

Till now, the explanation was given about the embodiments of the application concerned. Lastly, explained below with reference to FIG. 35 is a hardware configuration of the information processing device according to the embodiments of the application concerned. FIG. 35 is a block diagram illustrating an exemplary hardware configuration of the information processing device according to the embodiments of the application concerned. An information processing device 900 illustrated in FIG. 35 can implement, for example, the generation device 100, the delivery server 200, the client device 300, the generation device 600, and the reproduction device 800 illustrated in FIGS. 15 to 18, FIG. 26, and FIG. 27. The information processing performed by the generation device 100, the delivery server 200, the client device 300, the generation device 600, and the reproduction device 800 can be implemented as a result of cooperation between software and hardware explained below.

As illustrated in FIG. 35, the information processing device 900 includes a CPU (Central Processing Unit) 901, a ROM (Read Only Memory) 902, a RAM (Random Access Memory) 903, and a host bus 904a. Moreover, the information processing device 900 includes a bridge 904, an external bus 904b, an interface 905, an input device 906, an output device 907, a storage device 908, a drive 909, a connection port 911, a communication device 913, and a sensor 915. Meanwhile, the information processing device 900 can include, in place of or in addition to the CPU 901, a processing circuit such as a DSP or an ASIC.

The CPU 901 functions as an arithmetic processing device and a control device, and controls the overall operations of the information processing device 900 according to various programs. Alternatively, the CPU 901 can be a microprocessor. The ROM 902 is used to store the programs and the operation parameters to be used by the CPU 901. The RAM 903 is used to temporarily store the programs used by the CPU 901 during execution, and to temporarily store the parameters that undergo appropriate changes during the execution. The CPU 901 can constitute, for example, the generating unit 110, the control unit 120, the control unit 220, the processing unit 310, the control unit 340, the generating unit 610, the control unit 620, the processing unit 810, and the control unit 840.

The CPU 901, the ROM 902, and the RAM 903 are connected to each other by the host bus 904a including a CPU bus. The host bus 904a is connected to the external bus 904b such as a PCI (Peripheral Component Interconnect/ Interface) bus via the bridge 904. Meanwhile, the host bus 904a, the bridge 904, and the external bus 904b need not always be configured separately, and alternatively the functions of those buses can be implemented in single bus.

The input device 906 is configured using a device such as a mouse, a keyboard, a touch-sensitive panel, buttons, a microphone, switches, or levers for enabling the user to input information. Alternatively, the input device 906 can be, for example, a remote controller that uses infrared light or some other type of radio waves; or can be an external connection device such as a cellular phone or a PDA compatible to the operation of the information processing device 900. Moreover, the input device 906 can include, for example, an input control circuit that generates input signals based on the information input by the user from an input unit, and outputs the input signals to the CPU 901. Thus, by operating the input device 906, the user of the information processing device 900 can input a variety of data to the information processing device 900 and can issue various operation instructions.

The output device 907 is configured using a device capable of notifying the user about the obtained information in a visual or auditory manner. Examples of such a device include a display device such as a CRT display device, a liquid crystal display device, a plasma display device, an EL display device, or a lamp; an audio output device such as a speaker or headphones; and a printer device. For example, the output device 907 outputs the result of various operations performed in the information processing device 900. More particularly, the display device displays the result of various operations, which are performed in the information processing device 900, in a visual manner in various forms such as texts, images, tables, and graphs. The audio output device converts audio signals, which are made of the reproduced audio data or the reproduced acoustic data, into analog signals, and output them in an auditory manner.

The storage device 908 is a data storage device configured as an example of the memory unit of the information processing device 900. The storage device 908 is implemented using, for example, a magnetic memory device such as an HDD; a semiconductor memory device; an optical memory device; or a magneto-optical memory device. The storage device 908 can also include a memory medium, a recording device for recording data in the memory medium, a reading device for reading data from the memory medium, and a deleting device for deleting the recorded data from the memory medium. The storage device 908 is used to store the programs to be executed by the CPU 901, to store a variety of data to be used by the CPU 901, and to store a variety of data obtained from outside. The storage device 908 can constitute, for example, the memory unit 140, the memory unit 240, the memory unit 360, the memory unit 640, and the memory unit 860.

The drive 909 is a memory medium reader-writer that is either embedded in the information processing device 900 or externally attached to the information processing device 900. The drive 909 reads the information recorded in a removable memory medium such a magnetic disk, an optical disk, a magneto-optical disk, or a semiconductor memory inserted therein, and outputs the information to the RAM 903. Moreover, the drive 909 is also capable of writing information in a removable memory medium.

The connection port 911 is an interface connected to an external device, and represents a connection port for an external device capable of transmitting data using, for example, the USB (Universal Serial Bus).

The communication device 913 is, for example, a communication interface configured using a communication device for the purpose of establishing connection with a network 920. For example, the communication device 913 is, for example, a communication card meant for a wired LAN (Local Area Network) or a wireless LAN, or LTE (Long Term Evolution), or Bluetooth (registered trademark), or WUSB (Wireless USB). Alternatively, the communication device 913 can be a router for optical communication, or a router for ADSL (Asymmetric Digital Subscriber Line), or a modem for a variety of communication. The communication device 913 can communicate signals according to, for example, a predetermined protocol, such as the TCP/IP, with the Internet and other communication devices. The communication device 913 can constitute, for example, the communication unit 130, the communication unit 230, the communication unit 350, the communication unit 630, and the communication unit 850.

The sensor 915 represents, for example, various sensors such as an acceleration sensor, a gyro sensor, a geomagnetic sensor, an optical sensor, a sound sensor, a ranging sensor, and a force sensor. The sensor 915 obtains information about the state of the information processing device 900, such as the attitude and the movement speed of the information processing device 900; and obtains information related to the surrounding environment of the information processing device 900, such as the surrounding brightness and the surrounding noise of the information processing device 900. Meanwhile, the sensor 915 can also include a GPS sensor that receives GPS signals and measures the latitude, the longitude, and the altitude.

The network 920 represents a wired transmission path or a wireless transmission path for the information transmitted from the devices connected thereto. Examples of the network 920 include a public line network such as the Internet, a telephone network, or a satellite communication network; various types of LAN (Local Area Network) including Ethernet (registered trademark); and a WAN (Wide Area Network). Moreover, the network 920 can also include a dedicated network such as an IP-VPN (Internet Protocol-Virtual Private Network).

Till now, the explanation was given about an exemplary hardware configuration enabling implementation of the functions of the information processing device 900 according to the embodiments. The abovementioned constituent elements can be implemented using general-purpose members, or can be implemented using hardware specialized in the functions of the respective constituent elements. Thus, depending on the technological level at the time of putting the embodiments of the application concerned in execution, the hardware configuration can be modified in an appropriate manner.

Meanwhile, a computer program can be created for implementing the functions of the information processing device 900 according to the embodiments of the application concerned, and can be installed in a PC. Still alternatively, a computer-readable recording medium can be provided in which such a computer program is stored. Examples of the recording medium include a magnetic disk, an optical disk, a magneto-optical disk, and a flash memory. Still alternatively, instead of storing it in a recording medium, the computer program can be delivered via, for example, a network.

6. Summary

As explained above, according to the embodiments of the application concerned, the multi-view zoom viewpoint switching information (the viewpoint switching information) that is meant for switching among a plurality of viewpoints is used in content reproduction, so that the feeling of strangeness in the user can be reduced in a visual and auditory manner. For example, as explained above, based on the multi-view zoom viewpoint switching information, the display images can be displayed by matching the directions and the sizes of the photographic subjects before after the viewpoint switching. Moreover, as explained above, based on the multi-view zoom viewpoint switching information, as a result of correcting the positions of the audio objects at the time of viewpoint switching, it becomes possible to reduce the feeling of strangeness in the user.

Although the application concerned is described above in detail in the form of embodiments with reference to the accompanying drawings; the technical scope of the application concerned is not limited to the embodiments described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

For example, in the first embodiment, the explanation is given about an example in which the multi-view zoom switching information is stored in a metadata file. However, the concerned technology is not limited to that example. Alternatively, for example, even in the case of performing streaming delivery using MPEG-DASH as explained in the first embodiment; in place of or in addition to storing the multi-view zoom switching information in an MPD file, it can be stored in the header of an MP4 file as explained in the second embodiment. Particularly, in the case in which the multi-view zoom switching information changes according to the reproduction timing, it is difficult to store it in an MPD file. In that regard, even in the case of performing streaming delivery using MPEG-DASH, the multi-view zoom switching information can be stored as the "timed metadata track" in the "mdat" box as explained earlier with reference to FIGS. 31 and 32. With such a configuration, even in the case in which streaming delivery is performed using MPEG-DASH and in which the multi-view zoom switching information changes according to the reproduction timing, the multi-view zoom switching information can be provided to the devices that reproduce the content.

Meanwhile, whether or not the multi-view zoom switching information changes according to the reproduction timing can be determined by, for example, the content producer. In that regard, the storage destination for the multi-view zoom switching information can be decided based on the operations of the content producer or based on the information provided by the content producer.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

An information processing device comprising a content file generating unit that stores viewpoint switching information, which is to be used in correcting position of audio object during viewpoint switching among a plurality of viewpoints, in header of a content file, and generates the content file.

(2)

The information processing device according to (1), wherein
   the content file is an ISO Base Media File Format file,
   the header includes "moov" box of the content file, and
   the viewpoint switching information is stored in the "moov" box.

(3)

The information processing device according to (2), wherein the viewpoint switching information is stored in "udta" box of the "moov" box.

(4)

The information processing device according to (2), wherein the content file generating unit stores the viewpoint switching information in the "moov" box and also in "mdat" box in the content file.

(5)

The information processing device according to any one of (1) to (4), wherein the viewpoint switching information is stored in the content file in a corresponding manner to each viewpoint of the plurality of viewpoints.

(6)

The information processing device according to (5), wherein the viewpoint switching information contains switching destination viewpoint information about a switching destination viewpoint to which switching is possible from a viewpoint associated to the viewpoint switching information.

(7)

The information processing device according to (6), wherein the switching destination viewpoint information contains threshold value information about a threshold value for switching from the viewpoint associated to the viewpoint switching information to the switching destination viewpoint.

(8)

The information processing device according to any one of (5) to (7), wherein the viewpoint switching information contains photographing related information about an image photographed from the viewpoint associated to the viewpoint switching information.

(9)

The information processing device according to (8), wherein the photographing related information contains photographing position information about position of camera that photographed the image.

(10)

The information processing device according to (8) or (9), wherein the photographing related information contains photographing direction information about direction of camera that photographed the image.

(11)

The information processing device according to any one of (8) to (10), wherein the photographing related information contains photographing angle-of-view information about angle of view of camera that photographed the image.

(12)

The information processing device according to any one of (5) to (11), wherein the viewpoint switching information contains reference angle-of-view information about angle of view of screen that is referred to at time of deciding on position information of audio object related to a viewpoint associated to the viewpoint switching information.

(13)

An information processing method implemented in an information processing device, comprising:
generating that includes
storing viewpoint switching information, which is to be used in correcting position of audio object during viewpoint switching among a plurality of viewpoints, in header of a content file, and
generating the content file.

(14)

A program that causes a computer to implement a function of generating that includes
storing viewpoint switching information, which is to be used in correcting position of audio object during viewpoint switching among a plurality of viewpoints, in header of a content file, and
generating the content file.

(15)

An information processing device including a content file obtaining unit that obtains a content file in which viewpoint switching information, which is to be used in correcting position of audio object during viewpoint switching among a plurality of viewpoints, is stored in header thereof.

(16)

The information processing device according to (15), wherein
the content file is an ISO Base Media File Format file,
the header includes "moov" box of the content file, and
the viewpoint switching information is stored in the "moov" box.

(17)

The information processing device according to (16), wherein the viewpoint switching information is stored in "udta" box of the "moov" box.

(18)

The information processing device according to (16), wherein the viewpoint switching information is stored in the "moov" box and also in "mdat" box in the content file.

(19)

The information processing device according to any one of (15) to (18), wherein the viewpoint switching information is stored in the content file in a corresponding manner to each viewpoint of the plurality of viewpoints.

(20)

The information processing device according to (19), wherein the viewpoint switching information contains switching destination viewpoint information about a switching destination viewpoint to which switching is possible from a viewpoint associated to the viewpoint switching information.

(21)

The information processing device according to (20), wherein the switching destination viewpoint information contains threshold value information about a threshold value for switching from the viewpoint associated to the viewpoint switching information to the switching destination viewpoint.

(22)

The information processing device according to any one of (19) to (21), wherein the viewpoint switching information contains photographing related information about an image photographed from the viewpoint associated to the viewpoint switching information.

(23)

The information processing device according to (22), wherein the photographing related information contains photographing position information about position of camera that photographed the image.

(24)

The information processing device according to (22) or (23), wherein the photographing related information contains photographing direction information about direction of camera that photographed the image.

(25)

The information processing device according to any one of (22) to (24), wherein the photographing related information contains photographing angle-of-view information about angle of view of camera that photographed the image.

(26)

The information processing device according to any one of (19) to (25), wherein the viewpoint switching information contains reference angle-of-view information about angle of view of screen that is referred to at time of deciding on position information of an audio object related to a viewpoint associated to the viewpoint switching information.

(27)

An information processing method implemented in an information processing device, including obtaining a content file in which viewpoint switching information, which is to be used in correcting the positions of audio objects during viewpoint switching among a plurality of viewpoints, is stored in header thereof.

(28)

A program that causes a computer to implement a function of obtaining a content file in which viewpoint switching information, which is to be used in correcting the positions of audio objects during viewpoint switching among a plurality of viewpoints, is stored in header thereof.

REFERENCE SIGNS LIST 100 generation device
110 generating unit
111 image stream encoding unit
112 audio stream encoding unit
113 content file generating unit
114 metadata file generating unit
200 delivery server
300 client
310 processing unit
311 metadata file obtaining unit
312 metadata file processing unit
313 segment file selection control unit
321 segment file obtaining unit
323 file parsing unit
325 image decoding unit
327 rendering unit
329 object rendering unit
330 audio processing unit
331 segment file obtaining unit
333 file parsing unit
335 audio decoding unit
337 object position correcting unit
339 object rendering unit
340 control unit
350 communication unit
360 memory unit
400 output device
600 generation device
610 generating unit
611 image stream encoding unit
612 audio stream encoding unit
613 content file generating unit 700 memory device
710 generating unit
713 content file generating unit
800 reproduction device
810 processing unit
820 image processing unit
821 file obtaining unit
823 file parsing unit
825 image decoding unit
827 rendering unit
830 audio processing unit
831 file obtaining unit
833 file parsing unit
835 audio decoding unit
837 object position correcting unit
839 object rendering unit
840 control unit
850 communication unit
860 memory unit

The invention claimed is:

1. An information processing device, comprising:
at least one processor configured to:
control a storage device to store viewpoint switching information in a header of a content file, wherein
the viewpoint switching information is information for correction of a position of an audio object during switching of a viewpoint among a plurality of viewpoints,
the plurality of viewpoints includes a plurality of switching destination viewpoints,
the viewpoint switching information includes switching destination viewpoint information for each switching destination viewpoint of the plurality of switching destination viewpoints,
the switching destination viewpoint information corresponding to each switching destination viewpoint of the plurality of switching destination viewpoints includes a respective threshold value for each of the plurality of switching destination viewpoints, and
a first threshold value for a first switching destination viewpoint of the plurality of switching destination viewpoints is different from a second threshold value for a second switching destination viewpoint of the plurality of switching destination viewpoints; and
generate the content file based on the stored viewpoint switching information.

2. The information processing device according to claim 1, wherein
the content file is an ISO Base Media File Format file,
the header includes a "moov" box of the content file, and
the at least one processor is further configured to control the storage device to store the viewpoint switching information in the "moov" box.

3. The information processing device according to claim 2, wherein the at least one processor is further configured to control the storage device to store the viewpoint switching information in a "udta" box of the "moov" box.

4. The information processing device according to claim 2, wherein the at least one processor is further configured to control the storage device to store the viewpoint switching information in each of the "moov" box and a "mdat" box in the content file.

5. The information processing device according to claim 1, wherein
the at least one processor is further configured to control a client device to switch from a specific viewpoint to the plurality of switching destination viewpoints, and
the specific viewpoint is associated with the viewpoint switching information.

6. The information processing device according to claim 1, wherein the viewpoint switching information includes photographing related information related to an image photographed from a specific viewpoint associated with the viewpoint switching information.

7. The information processing device according to claim 6, wherein the photographing related information includes photographing position information related to a position of a camera that photographed the image.

8. The information processing device according to claim 6, wherein the photographing related information includes photographing direction information related to a direction of a camera that photographed the image.

9. The information processing device according to claim 6, wherein the photographing related information includes photographing angle-of-view information related to an angle of view of a camera that photographed the image.

10. The information processing device according to claim 1, wherein
the viewpoint switching information includes reference angle-of-view information related to an angle of view of a screen that is referred to at time of determination of position information of the audio object related to a specific viewpoint, and
the specific viewpoint is associated with the viewpoint switching information.

11. An information processing method, comprising:
storing viewpoint switching information in a header of a content file, wherein
the viewpoint switching information is information for correction of a position of an audio object during switching of a viewpoint among a plurality of viewpoints,
the plurality of viewpoints includes a plurality of switching destination viewpoints,
the viewpoint switching information includes switching destination viewpoint information for each switching destination viewpoint of the plurality of switching destination viewpoints,
the switching destination viewpoint information corresponding to each switching destination viewpoint of the plurality of switching destination viewpoints includes a respective threshold value for each of the plurality of switching destination viewpoints, and
a first threshold value for a first switching destination viewpoint of the plurality of switching destination viewpoints is different from a second threshold value for a second switching destination viewpoint of the plurality of switching destination viewpoints; and
generating the content file based on the stored viewpoint switching information.

12. A non-transitory computer-readable medium having stored thereon, computer-executable instructions, which when executed by a computer cause the computer to execute operations, the operations comprising:
storing viewpoint switching information in a header of a content file, wherein
the viewpoint switching information is information for correction of a position of an audio object during switching of a viewpoint among a plurality of viewpoints, the plurality of viewpoints includes a plurality of switching destination viewpoints,
the viewpoint switching information includes switching destination viewpoint information for each switching destination viewpoint of the plurality of switching destination viewpoints,
the switching destination viewpoint information corresponding to each switching destination viewpoint of the plurality of switching destination viewpoints includes a respective threshold value for each of the plurality of switching destination viewpoints, and
a first threshold value for a first switching destination viewpoint of the plurality of switching destination viewpoints is different from a second threshold value for a second switching destination viewpoint of the plurality of switching destination viewpoints; and generating the content file based on the stored viewpoint switching information.

* * * * *